(12) United States Patent
Astafiev et al.

(10) Patent No.: US 11,734,615 B2
(45) Date of Patent: *Aug. 22, 2023

(54) SYSTEMS AND METHODS OF DATABASE OPTIMIZATION AND DISTRIBUTED COMPUTING

(71) Applicant: ResponseLogix, Inc., Scottsdale, AZ (US)

(72) Inventors: Igor Astafiev, Scottsdale, AZ (US); Jagdish Rajan, Foster City, CA (US)

(73) Assignee: ResponseLogix, Inc., Scottsdale, AZ (US)

( * ) Notice: Subject to any disclaimer, the term of this patent is extended or adjusted under 35 U.S.C. 154(b) by 363 days.

This patent is subject to a terminal disclaimer.

(21) Appl. No.: 16/870,771

(22) Filed: May 8, 2020

(65) Prior Publication Data

US 2020/0342363 A1 Oct. 29, 2020

Related U.S. Application Data

(63) Continuation-in-part of application No. 15/639,599, filed on Jun. 30, 2017, now Pat. No. 10,650,330.
(Continued)

(51) Int. Cl.
*G06Q 30/00* (2023.01)
*G06Q 10/00* (2023.01)
(Continued)

(52) U.S. Cl.
CPC .......... *G06Q 10/00* (2013.01); *G06F 16/258* (2019.01); *G06Q 30/00* (2013.01);
(Continued)

(58) Field of Classification Search
CPC .............. G06Q 10/00; G06Q 30/0601; G06Q 30/0611; G06Q 30/0629; G06Q 30/00; G06Q 30/0631; G06F 16/258
(Continued)

(56) References Cited

U.S. PATENT DOCUMENTS

| 5,774,883 A | 6/1998 | Andersen et al. |
| 5,873,069 A | 2/1999 | Reuhl et al. |

(Continued)

FOREIGN PATENT DOCUMENTS

| EP | 1298561 A1 | 4/2003 |
| JP | 2001297226 A | 10/2001 |
| JP | 2001350952 A | 12/2001 |

OTHER PUBLICATIONS

Michelle A. Poolet "Performance-Tuning the Data Model: Thinner is Better" ITProToday (Source URL: https://www.itprotoday.com/analytics-and-reporting/performance-tuning-data-model-thinner-better) (Year: 2005).*

(Continued)

*Primary Examiner* — Anand Loharikar
(74) *Attorney, Agent, or Firm* — Carr & Ferrell LLP

(57) ABSTRACT

Systems and methods of database optimization and distributed computing are provided herein. In some embodiments, a method includes distributing remote agents to a plurality of remote computing systems, receiving incoming inventory from a database of available inventory via the remote agents, generating standardized inventory records, generating the database of available inventory that retains complete standardized inventory records, generating thin locator style records for the complete standardized inventory records, wherein the thin locator style records include key record identifiers, receiving a query, generating a standardized query, selecting the thin locator style records in response to the standardized query, obtaining the complete standardized inventory records corresponding to the thin locator style records of the selected key record identifiers, and providing the complete standardized inventory records to a requestor.

19 Claims, 18 Drawing Sheets

Related U.S. Application Data which is a continuation-in-part of application No. 13/719,130, filed on Dec. 18, 2012, now abandoned, which is a continuation of application No. 13/228,407, filed on Sep. 8, 2011, now Pat. No. 8,370,215, which is a continuation of application No. 12/883,154, filed on Sep. 15, 2010, now Pat. No. 8,036,952, which is a continuation of application No. 12/705,328, filed on Feb. 12, 2010, now abandoned, which is a continuation-in-part of application No. 12/475,368, filed on May 29, 2009, now abandoned, which is a continuation-in-part of application No. 12/215,940, filed on Jun. 30, 2008, now abandoned.

(60) Provisional application No. 60/937,856, filed on Jun. 30, 2007.

(51) Int. Cl.
 *G06Q 30/0601* (2023.01)
 *G06F 16/25* (2019.01)

(52) U.S. Cl.
 CPC ..... *G06Q 30/0601* (2013.01); *G06Q 30/0611* (2013.01); *G06Q 30/0629* (2013.01); *G06Q 30/0631* (2013.01)

(58) Field of Classification Search
 USPC .............................................. 705/26.1–27.2
 See application file for complete search history.

(56) References Cited

U.S. PATENT DOCUMENTS

| | | | |
|---|---|---|---|
| 5,956,693 A | 9/1999 | Geerlings | |
| 6,076,070 A | 6/2000 | Stack | |
| 6,236,977 B1 | 5/2001 | Verba et al. | |
| 6,311,896 B1 | 11/2001 | Mulla et al. | |
| 6,470,324 B1 | 10/2002 | Brown | |
| 6,553,350 B2 | 4/2003 | Carter | |
| 6,609,108 B1 | 8/2003 | Pulliam et al. | |
| 6,760,727 B1 | 7/2004 | Schroeder | |
| 6,901,430 B1 | 5/2005 | Smith | |
| 6,970,837 B1 | 11/2005 | Walker et al. | |
| 6,980,963 B1 | 12/2005 | Hanzek | |
| 6,993,494 B1 | 1/2006 | Boushy et al. | |
| 7,007,014 B2 | 2/2006 | Liu et al. | |
| 7,013,323 B1 | 3/2006 | Thomas et al. | |
| 7,050,874 B1 | 5/2006 | Tenorio | |
| 7,130,821 B1 | 10/2006 | Connors et al. | |
| 7,181,412 B1 | 2/2007 | Fulgoni et al. | |
| 7,212,978 B2 | 5/2007 | Kowal et al. | |
| 7,315,861 B2 | 1/2008 | Seibel et al. | |
| 7,353,192 B1 | 4/2008 | Ellis et al. | |
| 7,364,068 B1 | 4/2008 | Strubbe et al. | |
| 7,512,540 B2 | 3/2009 | Gluck et al. | |
| 7,529,694 B2 | 5/2009 | Crites | |
| 7,533,052 B2 | 5/2009 | Tilfors et al. | |
| 7,536,318 B1 | 5/2009 | Wolfe et al. | |
| 7,596,512 B1 | 9/2009 | Raines | |
| 7,606,897 B2 | 10/2009 | Izrailevsky et al. | |
| 7,620,575 B1 | 11/2009 | Tenorio | |
| 7,654,455 B1 | 2/2010 | Bhatti et al. | |
| 7,791,752 B2 | 9/2010 | Eschbach et al. | |
| 7,809,740 B2 | 10/2010 | Chung et al. | |
| 7,844,605 B2 | 11/2010 | Koran | |
| 7,856,373 B2 | 12/2010 | Ullah | |
| 7,856,429 B2 | 12/2010 | Herberger et al. | |
| 7,895,121 B2 | 2/2011 | Lukose et al. | |
| 7,949,578 B2 | 5/2011 | Johnson et al. | |
| 7,966,237 B2 | 6/2011 | Creed et al. | |
| 7,987,194 B1 | 7/2011 | Walker et al. | |
| 7,996,279 B1 | 8/2011 | Katz et al. | |
| 8,019,662 B2 | 9/2011 | Lucas | |
| 8,027,874 B2 | 9/2011 | Angles et al. | |
| 8,028,065 B2 | 9/2011 | Izrailevsky et al. | |
| 8,036,952 B2 | 10/2011 | Mohr et al. | |
| 8,065,185 B2 | 11/2011 | Foladare et al. | |
| 8,370,215 B2 | 2/2013 | Mohr et al. | |
| 8,428,985 B1 | 4/2013 | Puskorius et al. | |
| 9,053,514 B2 | 6/2015 | Bennett et al. | |
| 10,650,330 B2 | 5/2020 | Mohr et al. | |
| 2001/0032095 A1 | 10/2001 | Balbach | |
| 2001/0034726 A1 | 10/2001 | McMahon | |
| 2001/0037246 A1 | 11/2001 | Reiter et al. | |
| 2001/0047308 A1 | 11/2001 | Kaminsky et al. | |
| 2001/0054004 A1 | 12/2001 | Powers | |
| 2002/0010745 A1 | 1/2002 | Schneider | |
| 2002/0032610 A1 | 3/2002 | Gold et al. | |
| 2002/0040356 A1 | 4/2002 | Gluck et al. | |
| 2002/0052778 A1 | 5/2002 | Murphy et al. | |
| 2002/0059099 A1 | 5/2002 | Coletta | |
| 2002/0071604 A1* | 6/2002 | Orpaz ................. A45D 44/005 382/284 |
| 2002/0082860 A1 | 6/2002 | Johnson | |
| 2002/0178166 A1 | 11/2002 | Hsia | |
| 2003/0065583 A1 | 4/2003 | Takaoka | |
| 2003/0200151 A1 | 10/2003 | Ellenson et al. | |
| 2004/0103025 A1 | 5/2004 | Ulf et al. | |
| 2004/0143476 A1 | 7/2004 | Kapadia et al. | |
| 2005/0114200 A1 | 5/2005 | Rivera | |
| 2005/0144095 A1 | 6/2005 | Scruton et al. | |
| 2005/0144121 A1 | 6/2005 | Mayo | |
| 2005/0149414 A1 | 7/2005 | Schrodt et al. | |
| 2005/0154648 A1 | 7/2005 | Strause | |
| 2005/0216844 A1 | 9/2005 | Error et al. | |
| 2005/0267774 A1 | 12/2005 | Merritt | |
| 2006/0038010 A1 | 2/2006 | Lucas | |
| 2006/0064315 A1 | 3/2006 | Koch et al. | |
| 2006/0074919 A1 | 4/2006 | Grover et al. | |
| 2006/0080210 A1 | 4/2006 | Mourad et al. | |
| 2006/0161633 A1 | 7/2006 | Quine | |
| 2006/0293956 A1 | 12/2006 | Walker et al. | |
| 2007/0005446 A1 | 1/2007 | Fusz | |
| 2007/0022010 A1 | 1/2007 | Blaser et al. | |
| 2007/0055586 A1 | 3/2007 | Lucas | |
| 2007/0124216 A1 | 5/2007 | Lucas | |
| 2007/0124399 A1 | 5/2007 | Gillespie et al. | |
| 2007/0129993 A1 | 6/2007 | Alvin | |
| 2007/0162318 A1 | 7/2007 | Bean et al. | |
| 2007/0219916 A1 | 9/2007 | Lucas | |
| 2007/0239569 A1 | 10/2007 | Lucas et al. | |
| 2008/0015954 A1 | 1/2008 | Huber | |
| 2008/0033831 A1 | 2/2008 | Boss et al. | |
| 2008/0144802 A1 | 6/2008 | Stuart | |
| 2008/0250136 A1 | 10/2008 | Izrailevsky et al. | |
| 2008/0281757 A1 | 11/2008 | Riise et al. | |
| 2009/0006118 A1 | 1/2009 | Pollak | |
| 2009/0006159 A1 | 1/2009 | Mohr et al. | |
| 2009/0157522 A1 | 6/2009 | Srinivasan et al. | |
| 2009/0198507 A1 | 8/2009 | Rhodus | |
| 2009/0240602 A1 | 9/2009 | Mohr et al. | |
| 2009/0248494 A1 | 10/2009 | Hueter et al. | |
| 2010/0042467 A1 | 2/2010 | Bundy et al. | |
| 2010/0088158 A1 | 4/2010 | Pollack | |
| 2010/0153235 A1 | 6/2010 | Mohr | |
| 2010/0153236 A1 | 6/2010 | Mohr | |
| 2010/0332344 A1 | 12/2010 | Mohr et al. | |
| 2010/0332345 A1 | 12/2010 | Mohr et al. | |
| 2011/0035288 A1 | 2/2011 | Clyne | |
| 2011/0087550 A1 | 4/2011 | Fordyce et al. | |
| 2011/0184813 A1 | 7/2011 | Barnes et al. | |
| 2011/0276383 A1 | 11/2011 | Heiser et al. | |
| 2011/0320305 A1 | 12/2011 | Mohr et al. | |
| 2017/0300835 A1 | 10/2017 | Mohr et al. | |
| 2017/0322971 A1 | 11/2017 | Seshadri et al. | |

OTHER PUBLICATIONS

Lori MacVittie "Don't Fear The Data", Network Computing Sep. 16, 2004; 15, 18 (pp. 43-58) (Year: 2004).*

(56) References Cited

OTHER PUBLICATIONS

Moran, Rob & Robyn Slater, Subaru Launches New Owner's Site—My.Subaru.com, PR Newswire, New York (Dec. 4, 2000) at p. 1. Accession No. 64905741, 3 pages.
White, Ron, "How Computers Work", Millennium Ed., Queue Corporation, Indianapolis, IN, 1999 (Part 1: 142 pages, Part 2: 142 pages).
Morton, Fiona S. et al. "Internet Car Retailing", National Bureau of Economic Research, Working Paper 7961, Oct. 2000, 34 pages.
Poolet, Michelle A., "Performance-Tuning the Data Model: Thinner is Better," ITProToday [online], Aug. 18, 2005 [retrieved Dec. 14, 2019], Retrieved from the Internet: <URL: https://www.itprotoday.com/analytics-and-reporting/performance-tuning-data-model-thinner-better>, 5 pages.
MacVittie, Lori, "Don't Fear The Data," Network Computing, Sep. 16, 2004, pp. 43-58.

\* cited by examiner

Desired Vehicle

2008 Chevrolet Impala LT
VIN: 2G1WT55K281238773 (Stock #TR9421)

See Details

Engine: Gas/Ethanol V6 3.5L/214
Transmission: Automatic
Exterior Color: Silver
Interior Color: Other
Mileage: 45,622
City: 18 MPG/ Hwy: 29 MPG

Your Price: $11,892

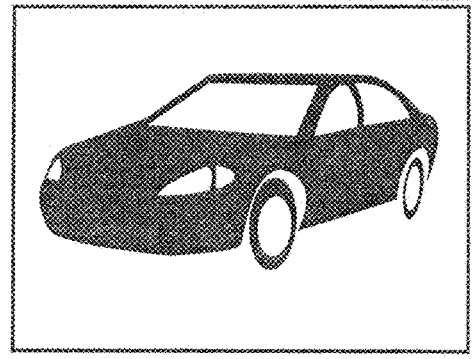

Pre-Owned Alternatives

View All Of Our Pre-Owned Inventroy

2008 Chevrolet Impala LS

See Details

Engine: Gas/Ethanol V6 3.5L/214
Transmission: Automatic
Exterior Color: Silver
Interior Color: Grey
Mileage: 33,381
City: 18 MPG/ Hwy: 29 MPG

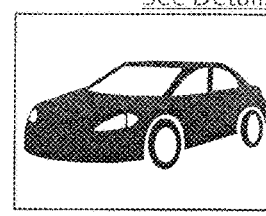

VIN: 2G1WB55K781295294
Stock #: TR9421

Your Price: $12,591

2009 Toyota Camry Hybrid Hybrid Sedan

See Details

Engine: Gas/Electric I4 2.4L/144
Transmission: Variable
Exterior Color: Black
Interior Color: Grey
Mileage: 10,921
City: 33 MPG/ Hwy: 34 MPG

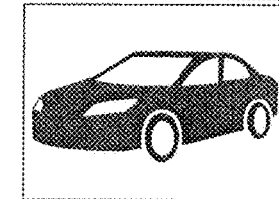

VIN: 4T1BB46K89U098859
Stock #: TR9428

Your Price: $27,992

2009 Toyota Camry SE Sedan

See Details

Engine: Gas V6 3.5L/211
Transmission: Automatic
Exterior Color: Grey
Interior Color: Black
Mileage: 18,744
City: 19 MPG/ Hwy: 28 MPG

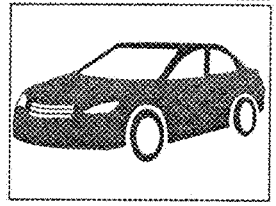

VIN: 4T1BK46K69U592525
Stock #: FL9469

Your Price: $26,591

FIG. 5A

2008 Ford Expedition

King Ranch (420A) 4dr 4x4
(Manufacturer Code K18)
View Factory Window Sticker

* Heavy Duty Tow Package

| | |
|---|---|
| MSRP: | $32,550 |
| Dealer Discount: | -$5,000 |
| Factory Rebates: | -$2,250 |

$25,250 *

2008 Ford Expedition

King Ranch (420A) 4dr 4x4
(Manufacturer Code K18)
View Factory Window Sticker

* Heavy Duty Tow Package
* Air Suspension Read - Load Leveling

| | |
|---|---|
| MSRP: | $34,550 |
| Dealer Discount: | -$5,000 |
| Factory Rebates: | -$2,250 |

$27,250 *

2008 Ford Expedition

King Ranch (420A) 4dr 4x4
(Manufacturer Code K18)
View Factory Window Sticker

* Heavy Duty Tow Package
* Air Suspension Read - Load Leveling
* Rear Seat Entertainment DVD

| | |
|---|---|
| MSRP: | $38,550 |
| Dealer Discount: | -$5,000 |
| Factory Rebates: | -$2,250 |

2009 Honda Civic

Conservatively Equipped

2009 Honda Civic

Model #FA1659EW
(LX 5-Speed Automatic 4dr Sedan)

MSRP: $18,965
Internet Sale Price: $16,928

Comfortably Equipped

2009 Honda Civic

Model #FA1669EW
(LX-S 5-Speed Automatic 4dr Sedan)

MSRP: $19,565
Internet Sale Price: $17,478

Generously Equipped

2009 Honda Civic

Model #FA1659EW
(EX 5-Speed Automatic 4dr Sedan)

MSRP: $20,815
Internet Sale Price: $18,625

SYSTEMS AND METHODS OF DATABASE OPTIMIZATION AND DISTRIBUTED COMPUTING

CROSS-REFERENCE TO RELATED APPLICATIONS

This application is a continuation-in-part of U.S. application Ser. No. 15/639,599, filed Jun. 30, 2017, now U.S. Pat. No. 10,650,330, which is a continuation-in-part of U.S. application Ser. No. 13/719,130, filed Dec. 18, 2012, which is a continuation of U.S. application Ser. No. 13/228,407, filed Sep. 8, 2011, now U.S. Pat. No. 8,370,215, which is a continuation of U.S. application Ser. No. 12/883,154, filed Sep. 15, 2010, now U.S. Pat. No. 8,036,952, which is a continuation of U.S. application Ser. No. 12/705,328, filed Feb. 12, 2010, which is a continuation-in-part of U.S. application Ser. No. 12/475,368 filed May 29, 2009, which is a continuation-in-part of U.S. application Ser. No. 12/215,940, filed Jun. 30, 2008, which claims the benefit of U.S. Provisional Application No. 60/937,856, filed Jun. 30, 2007, the disclosures of which are all incorporated herein by reference in their entirety including all references cited therein.

BACKGROUND OF THE INVENTION

Field of the Invention

The present disclosure relates generally to database optimization and distributed computing. In some embodiments the system and methods of the present disclosure are directed to distributed computing agents that provide efficient database maintenance through generation of thin locator style records for full database records and use of these thin locator style records for database updates and execution of queries for full database records. The disclosure further discloses the updating of database records in a standardized record format and quote requests where the database queries use terms matching the standardized database record format for the fields.

SUMMARY OF THE INVENTION

Example methods and systems comprise: distributing remote agents to a plurality of remote computing systems, receiving incoming inventory from the database of available inventory via the remote agents, generating a database of available inventory that comprises complete inventory records, generating thin locator style records for the complete inventory records, wherein the thin locator style records comprise key record identifiers, selecting thin locator style records in response to the standardized query, obtaining complete standardized inventory records corresponding to the thin locator style records of the selected key record identifiers, and providing the complete standardized inventory records to a requestor.

Embodiments of the present disclosure comprise a system having: remote agents distributed to a plurality of remote computing systems; and a server in communication with the remote agents that: (i) receives incoming inventory from the database of available inventory from the remote agents; (ii) generates a standardized inventory record; (iii) generates a database of available inventory that comprises complete standardized inventory records; (iv) generates thin locator style records for the complete standardized inventory records, wherein the thin locator style records comprise key record identifiers; (v) receives a query and generates a standardized query, (vi) selects thin locator style records in response to the standardized query; (vii) obtains complete standardized inventory records corresponding to the thin locator style records of the selected key record identifiers; and (viii) provides the complete standardized inventory records to a requestor.

Further embodiments of the present invention may further include computer-readable storage media having embodied thereon programs executable by a processor to perform a method for automated alternatives selection for compound price quotes. Such computer-readable storage media may provide for performance via integration into existing client systems and/or via plug-in.

BRIEF DESCRIPTION OF THE FIGURES

FIG. 5A illustrates an exemplary screenshot of a compound price quote according to one embodiment.

FIG. 5B illustrates an exemplary screenshot of a compound price quote according to an alternative embodiment.

DETAILED DESCRIPTION

Figure 1A:
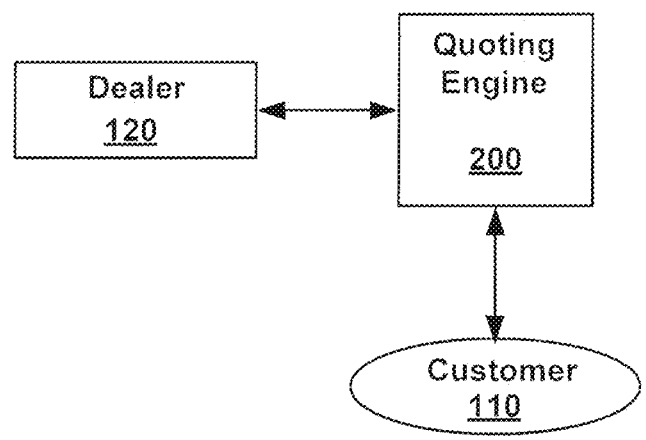
FIG. 1A illustrates an exemplary architecture for generating a price quote.

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

When making purchases, one of the most important considerations for a buyer is price. However, pricing can be dependent on multiple factors: including type of item, specifications and features of the item, age, mileage, demand, degree of use (i.e., used, new), location, seller/dealer, etc. Such factors may affect the price dramatically and further complicate the process of determining, analyzing, and comparing prices for a desired product. Automobiles, for example, may come in various makes, models, trims, colors, features (standard equipment, options, and upgrades), etc. Such options and upgrades, or removal thereof, may increase or decrease the price of the final product.

Another consideration when customers are shopping for a particular product is availability, specifically availability within a certain geographic region. Many customers wish to see, touch, and test a product before committing to a purchase, especially costly purchases. Some vehicles, due to size, weight, rarity, etc., may be difficult, costly, or time-consuming to transport to the customer. As such, the customer may wish to find a seller or dealer of the product within a certain geographic region that is convenient to the customer. The geographic location of a car dealer, for example, may be an important factor to a car-buyer, since transporting an automobile from a distant location may be either costly, time-consuming, or both. Determining availability within a geographic region therefore becomes very important to the customer.

In some instances, a customer may request a particular vehicle, but may be open to considering alternatives, particularly if the alternative has a more attractive price point or has a different set of desirable features. Such alternatives may include vehicles that share some similarities to the requested vehicle, but may not turn up in a search for the requested vehicle. For example, a customer who requests a particular make and model of truck may be open to purchasing alternative trucks, either of the same make, model, year, trim, color, body style, usage level, etc. Because customers generally lack the ability to review dealer inventories, however, they may not know to ask whether such alternatives exist or are available.

As such, there is therefore a need in the art for improved systems and methods for selection of alternatives and generation of compound price quotes, including quotes for alternatives.

Embodiments of the present invention include methods and systems for alternatives selection for compound price quotes. A database is maintained regarding a variety of vehicles and the features associated with each. A requesting party submits a request that includes information regarding at least one specification. Search results are retrieved from the database regarding the specification provided by the request. It is determined that the search results do not meet a predefined target, and an alternative specification is identified. At least one other set of search results is retrieved from the database. Vehicles are selected from the first set or subsequent sets of search results in order to meet the target. A price quotes is generated for each of the selected vehicles. The automated nature of such price quotes provides a customer with information that is timely, detailed, and accurate with respect to features, pricing, and availability. In addition, identifying alternatives and providing quotes for such alternatives provides the requesting party with choice and variety. Such price quoting also provides dealers with speed of response to the requesting party, more pricing flexibility, greater accuracy, and significant time savings.

FIG. 1A illustrates an exemplary architecture for generating an automated price quote. The parties involved may include the customer 110, dealer (or seller) 120 of a product, and the quoting engine 200. In the illustrated embodiment, the customer 110 communicates with quoting engine 200, which in turn, can convey information to the dealer 120 through the dealer's customer relationship management (CRM)/Internet lead management (ILM) system.

Figure 1B:
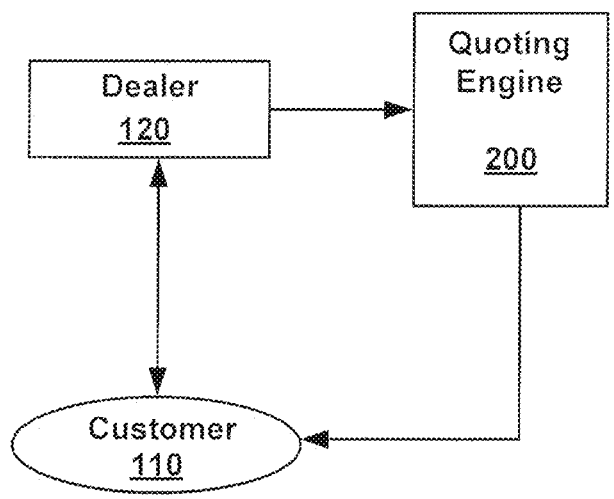
FIG. 1B illustrates an alternative architecture for generating a price quote according to another embodiment of the present invention.

FIG. 1B illustrates an alternative architecture for generating a price quote according to another embodiment of the present invention. Such an architecture may result from a plug-in model, in which price quoting in integrated into the CRM/ILM system of the dealer. As such, the customer communicates with the dealer's 120 CRM/ILM system, the CRM/ILM system communicates the issuance of the price quote to the quoting engine 200, the quoting engine 200 issues the price quote to customer 110.

Searching the database 210 can be more efficient if consistent terms are used and thus a search is for an exact match. However, the inventory records received from dealers or other suppliers may use identifiable but different terms. Different dealership records may refer to the car type using different or abbreviated terms. Thus, the fields in a database query request can be identified and transformed into a database compatible format. For example, a dealership inventory record or quote request may refer to the car type as a CHEV where the database uses CHEVROLET. Other examples of how queries or inventory record updates can vary from the database format include using "DL" where the database 210 may use "Deluxe", "SDN" instead of "Sedan", "19" instead of the full year "2019". Thus, in one embodiment, to access the database 210 or to store a new inventory record, the remote agent inventory record is change into a standardized inventory record by mapping fields in the record to a standardized field value. Additionally, a dealer or customer request for a price quote can be transformed into standardized fields terms.

The quote request, provided by the dealership, can be formatted as a string which can be parsed into tokens. The tokens can be identified to belong to a particular field in the database. Example fields include but are not limited to make, model, year, trim, color, body style, vehicle segment, duty type, option, use level, inventory age, equipment level, and vehicle identification number (VIN). For example, '19 or 19 could be mapped to 2019. SND, 4-door, 4 door, and any other abbreviation of "Sedan" can be mapped to a standard format query or into a standard format inventor record.

Figure 2:
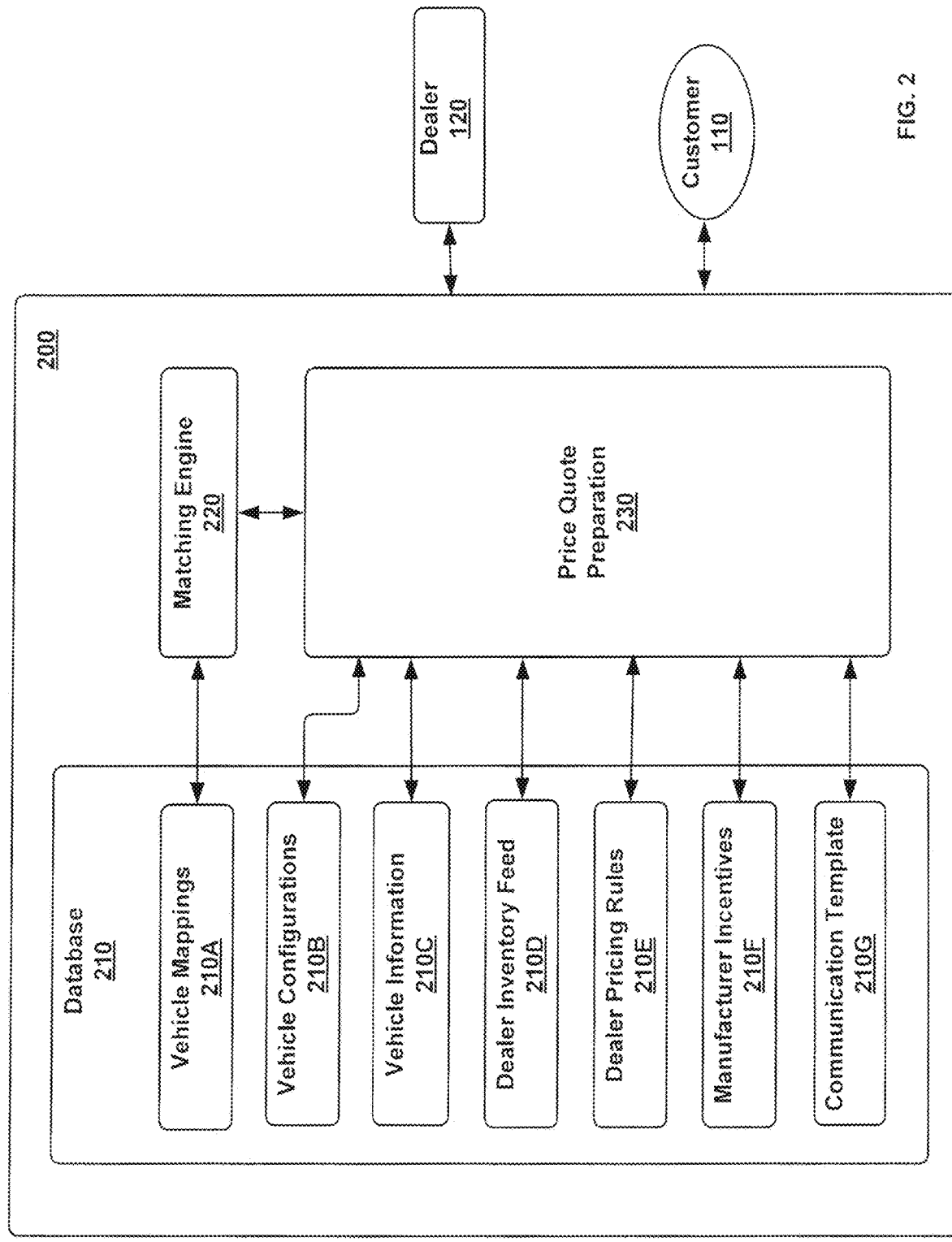
FIG. 2 illustrates an exemplary embodiment of a quoting engine system for generating a price quote.

FIG. 2 illustrates an exemplary embodiment of a quoting engine 200 for generating a price quote. The quoting engine 200 includes a database 210, a matching engine 220, and a price quote preparation engine 230. Database 210 stores information concerning various product specifications.

If the product is a vehicle, for example, database 210 may store vehicle mappings 210A, vehicle configurations 210B, vehicle information 210C, information from dealer inventory feeds 210D, dealer pricing rules 210E, manufacturer incentives 210F, and communication templates 210G, as illustrated in FIGS. 2.

Vehicle mappings database 210A includes various translations understood to be a particular vehicle by the quoting engine 200. For example, a customer 110 may request a particular vehicle (e.g., 2009 Toyota Corolla LE 4-door sedan), while the quoting engine 200 understands the same vehicle as a 2009 Toyota Corolla LE 4-dr SDN. Because the descriptions are slightly different, quoting engine 200 may map, translate, or otherwise understand that both descriptions apply to the same vehicle based on information stored under vehicle mappings database 210A:

2009 Toyota Corolla LE 4-dr SDN=2009 Toyota Corolla LE 4-Door Sedan

The matching is performed by matching engine 220. Once an incoming price quote request is received from the customer 110, a product description may be identified in the request and matched to a product description of one or more dealers 120 by matching engine 220. Matching engine 220 uses the information stored in vehicle mappings 210A to determine what product is being requested by the customer 110. In some embodiments, new and updated vehicle mappings may be added manually, automatically, or both, to vehicle mappings database 210A. Some embodiments may track manual mappings, determine that manual mappings have occurred a certain number of times, and store the particular mappings under vehicle mappings 210A for automatic mapping in the future.

Vehicle configurations database 210B includes information concerning specific products. Such information may be expressed as any combination of options or features associated with a vehicle identified by matching engine 220. The configurations may be stored in the form of a specific vehicle as uniquely identified by its VIN number (very specific) or vehicle configurations available at a given dealership or dealerships in a geographic region (less specific). For a given combination of "Year, Make, Model" or "Year, Make, Model, Trim," vehicle configurations database 210B may list multiple vehicle configurations that will be included in the price quote. In some embodiments, new and updated configurations may be added to vehicle configurations database 210B due to the use of the quoting engine 200, just as new mappings may be added to vehicle mappings 210A.

Vehicle information 210C includes further information and specifications for a given vehicle type. The vehicle information in 210C provides customer 110 of the vehicle price quote with the vehicle's description as well as the descriptions of the options, features, and equipment available and/or included on the quoted vehicles. For example, a customer 110 may request a particular make and model, but be unaware of what further options and features are available. Such information may be accessed from vehicle information 210C of the database 210 and provided to the customer 110, for each vehicle within the compound price quote.

Exemplary specifications may include make, model, year, trim, color, body style, vehicle segment, duty type, option, use level, inventory age, equipment level, and vehicle identification number (VIN). Make may refer to a manufacturer branded line of vehicles (e.g., Ford, Toyota, Nissan). Model may refer to a specific branded model of vehicle within the line (e.g., Focus (Ford), Camry (Toyota)). Trim may refer to a style of vehicle for the model (e.g., DX, EX, LX). Body style may refer to a classification of vehicles based on a type of vehicle body (e.g., sedan, truck, sport utility vehicle (SUV)) independent of the particular manufacturer. Vehicle segment may refer to another generalized classification of vehicles (e.g., compact, mid-sized, luxury, all-wheel drive (AWD)). Duty type may refer to any sub-classification within a body style or vehicle segment (e.g., light duty, heavy duty).

In addition, options may include any additional features or accessories that may be included or added to a vehicle (e.g., sound system, security system, global positioning system (GPS)). Use level may refer to whether the vehicle is new, pre-owned, and indicators regarding extent of usage, such as mileage. Inventory age may refer to a length of time the dealer has had the particular vehicle in inventory. Equipment level may refer to a generalized classification regarding the various features or options included in a vehicle (e.g., conservatively equipped, comfortably equipped, generously equipped). A VIN is a unique identifier associated with each vehicle. Within a dealership, the vehicle may also be referred to by a stock number.

Figure 3:
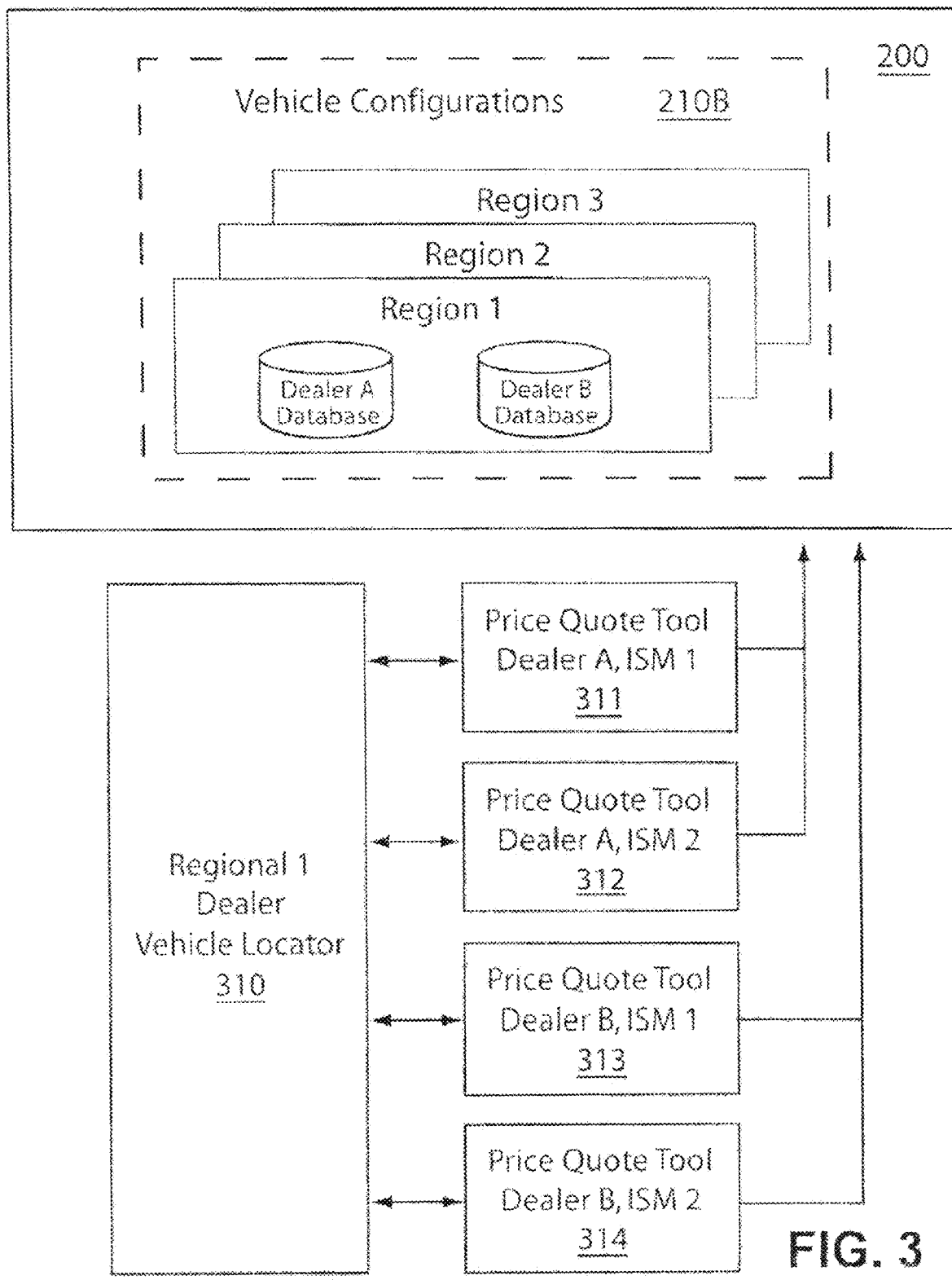
FIG. 3 illustrates an exemplary architecture for receiving dealer information.

Dealer inventory feed database 210D includes lists of vehicles currently at a given dealer 120 along with information that may be obtained by decoding the vehicle identification number (VIN) number associated with each vehicle. This database is used to provide information relating to actual new and used vehicles available from a particular dealer 120 that may match the price quote request submitted by the customer 110. In some embodiments, available alternatives to the new vehicle may be determined and presented to the customer 110. Such alternatives may include higher-end models/trims, lower-end models/trims, as well as used/new alternatives. For example, a customer 110 requesting a price quote for a used vehicle may also be presented with price quotes for new vehicles with the same (or similar) specifications, and vice versa. The information stored in dealer inventory feed database 210D may be received from multiple dealers in any geographic region. FIG. 3, described in further detail below, illustrate one way that information may be provided to dealer inventory feed database 210D.

Dealer pricing rules database 210E includes rules and the pricing values by which the dealer 120 arrives at the final price of a given vehicle. These rules are stored in advance of an incoming vehicle price quote request.

Manufacturer incentive database 210F contains manufacturer incentives offered directly to customer 110. These incentives may include cash back rebates, special financing rates, or special lease rates to influence a customer's purchase decision.

Communication template database 210G is stored in advance of the issuance of a price quote. The template may contain information layout, copy, graphics or the like that may be used at the time a vehicle price quote request is issued. The communication method used to inform the customer 110 of a vehicle price quote may be e-mail, webpage, text message, mobile communication, and other forms of communication commonly used in the art.

Searching the information available in database 210A-G allows for determination of answers to the following questions:

What is the specified product,
   Whether the specified product is available in the specified geographical region and from what dealers,
What other specifications are available for the specified product,
How many units of the specified product are available from a dealer,
How much the dealer is quoting for the specified product,
Whether any alternatives exist and any cost adjustment for each alternative,
Whether the specified product qualifies for any manufacturer incentives (e.g., cashback rebates, special financing options, special lease rates),
Which sales representative at a dealership is issuing the price quote,
How the price quote will appear to customer 110 and the means of delivery.

FIG. 3 illustrates an exemplary architecture for receiving dealer information. The availability of a product by configuration, as well as by dealer 120 or dealers 120 in a geographic region, may need to be determined before generation of a price quote. In some cases such as the customer 110 calling the dealer 120 by telephone or requesting an updated/refined price quote based on new information provided to the dealer 120, a dealer 120 may request the issuance of a price quote on behalf of a customer 110.

The dealer 120 as part of requesting the issuance of a price quote to customer 110 may select an existing vehicle configuration from the vehicle configurations database 210B or create a new vehicle configuration if needed. Alternatively, the request for issuing a price quote by dealer 120 may be based on a regional vehicle search using a tool such as a regional vehicle locator 310 provided by, for example, the original equipment manufacturer (OEM), prior to submitting the price quote request. Regional vehicle locator 310 operates in conjunction with inventory supply management (ISM) systems at one or more dealers 120 to provide dealer cost and inventory availability of a vehicle manufactured by the OEM. Multiple uses of the regional vehicle locator 310 provides frequent updates 311-314 (e.g., Price Quote Tool Dealership A, ISM 1, Price Quote Tool Dealership A, ISM 2, Price Quote Tool Dealership B, ISM 1, and Price Quote Tool Dealership B, ISM 2, respectively) concerning such dealer cost and inventory of one or more dealers 120 in a geographic region. As such, the information concerning inventory of vehicles available across dealerships within a particular region may be continuously provided to quoting engine 200. Upon locating a vehicle in the region, the dealer 120 may submit a price quote request on behalf of the customer 110 based on the configuration of the vehicle retrieved from the regional vehicle locator 310. As such, the particular vehicle configuration is passed along to the quoting engine 200 and stored in vehicle configurations database 210B.

Figure 4:
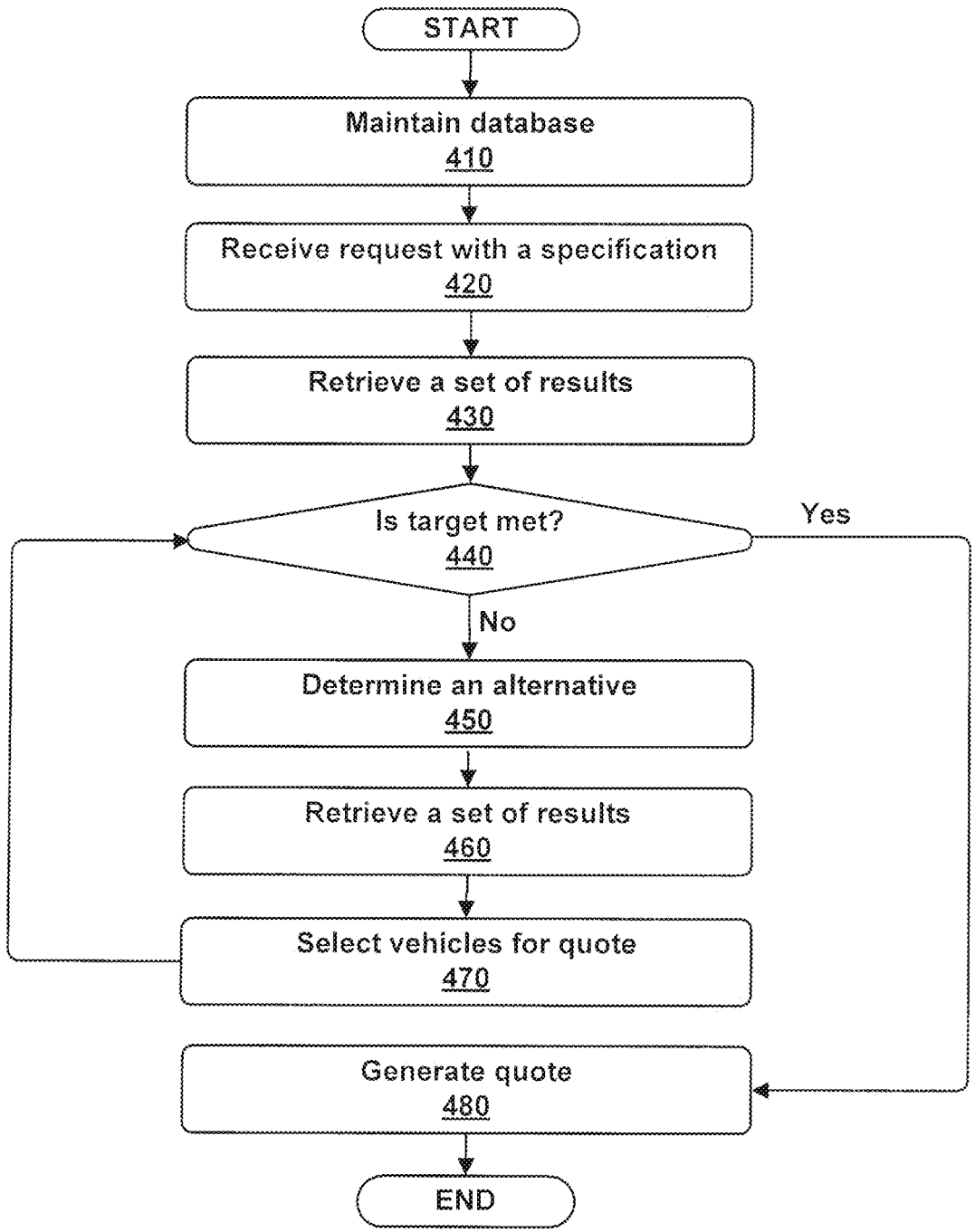
FIG. 4 illustrates an exemplary method for alternative selection for compound price quotes.

FIG. 4 illustrates an exemplary method 400 for alternatives selection for compound price quotes. Method 400 may include maintaining a database of vehicles and their respective features, receiving a quote request indicating a specification, retrieving a set of search results from the database based on the specification, determining that the set of search results does not meet a target, determining an alternative to the specification, retrieving a set of search results based on the alternative, selecting a plurality of vehicles in order to meet the target, the selections coming from the first set or subsequent sets of search results, and generating a compound price quote including quotes for a plurality of vehicles in a response to the request.

In step 410, a database is maintained regarding multiple vehicles and the features associated with each vehicle.

Each vehicle in database 210 may be associated with a dealer/location and described in terms of its specifications such as make, model, year, trim, color, body style, vehicle segment, duty type, option, use level, inventory age, equipment level, price, and vehicle identification number (VIN). The database may be searched based on a variety of parameters. For example, a search may be based on geographic location such that the vehicles available from one or more dealers in a particular geographic location may be identified. The available vehicles may further be filtered based on one or more specifications (e.g., make, model). Changing the specifications allows for different results to be retrieved.

In step 420, a price quote request is received. Such a price quote request may be sent directly from a customer 110 or from a dealer 120, who may be submitting the price quote request on behalf of one or more customers 110. The price quote request may indicate a particular product of interest and at least one specification indicating a feature. For example, a price quote request may be as broad as "Blue Honda Civic" or as specific as indicating an exact vehicle by VIN. The price quote request may further specify preferences with respect to any feature of the requested vehicle. Such preferences may specify a particular model, trim level, body style, price range, equipment level, presence of a particular option, etc. Alternatively, the preference may indicate a minimum level of a feature (e.g., at least LX trim), such that higher levels may be acceptable and of interest to the requesting party. The preference may also indicate a maximum level (e.g., no more than $40,000) to allow for lower levels to be retrieved for consideration.

In the step 420, the price quote is converted into a database query. This step can map quote terms to the standardized terms used by the database 210. For example, a quote for a '18 CHEVY can result in a query for a CHEVROLET in the database make field and 2018 in the database year field.

In step 430, a set of search results is retrieved from database 210 based on the specification(s) indicated in the request. As part of the search, the specification provided in the price quote request is compared to the information stored in vehicle mappings 210A. For example, a price quote request concerning a particular make and model is automatically mapped/translated to the description understood by quoting engine 200. Specifically, availability information regarding one or more dealers in or around a particular location may be determined. If a search is based on make and model (e.g., Toyota Camry), for example, a set of search results may include information regarding the twenty Toyota Camry vehicles available from the local Toyota dealer.

In step 440, it is determined whether the predefined target is met when including alternatives in the compound price quote. The target may include one or more parameters predefined by a dealer, an administrator, the user, or a combination of the foregoing. The target may refer to the type(s) of search results desired. For example, a target may refer to a desired number of results (e.g., different vehicle configurations, different price quotes), a desired range of results (e.g., price range), etc. Rather than just giving just one quote for one vehicle or one average quote, a dealer may wish to provide its customers with specific price quotes for multiple vehicles, for example, representing a range of prices and/or features. Additionally, the dealer may want to include alternative pre-owned vehicles within the compound price quote when the request is for a new vehicle and vice versa (i.e., including alternative new vehicles within the compound price quote in response to a request for a pre-owned vehicle).

For example, a dealer may specify that its customers receive at least three price quotes in low, medium, and high ranges that are at least $2000 apart. A customer of that dealer who searches for a 2010 Toyota Camry CE may therefore receive price quotes for three 2010 Toyota Camry CE vehicles with price quotes of $25,000, $30,000, and $35,000. Where a request does not specify trim or the dealer wants to include alternative trims within the compound price quote, the differences in the price quotes may be based on differing trim (e.g., DX, LX, EX). The difference in price quotes may further be based on differences in other features not specifically enumerated in the request (e.g., options, duty level, equipment level). If the search results meet the target, then the method may proceed to step 480 for price quote generation.

If the search results do not meet the target, the method may proceed to step 450. Depending on how specific the specifications of the search are, a dealer may not have any or enough vehicles in inventory that meet the requested specification. Where search results based solely on a request fails to meet a target number, close alternatives may be identified. As such, in step 450, an alternative specification may be determined. Selection of the alterative specification may be based on default parameters and/or be defined based on preferences of a dealer, administrator, etc. Depending on the target specified, the alternative specification may be chosen to substitute or supplement the requested specification to broaden, narrow, or otherwise supplement the search.

FIG. 5A illustrates an exemplary screenshot of a compound price quote according to one embodiment. Specifically, the illustrated compound price quote is based on a price quote request for a specific VIN of a 2008 Chevrolet Impala LT. Based on the dealer inventory, a search based on a particular VIN number may not retrieve any results or only retrieves one result, despite the target specifying at least four results. To find alternatives to include in the price quote, an alternative specification may be substituted, specifying a different year, make, model, trim, etc.

An alternative specification may pertain to a feature not specified in the request, but identified from the retrieved search results. For example, a search may refer to a vehicle having a particular VIN. Information regarding that vehicle may be retrieved, and the make, model, and other features of the vehicle having that VIN number may be determined. Referring to the previous example, a particular 2008 Chevrolet Impala LT may be identified from the VIN number. In selecting alternatives to meet the target, the determined alternative specification may broaden the search to find vehicles having the same or similar vehicle configuration or combination of features. A subsequent search may retrieve other Chevrolet Impala LT vehicles (e.g., same make/model/ trim), other Chevrolet Impala vehicles (e.g., same make/ model), other sedans (e.g., same body style), etc., based on alternate and/or broader specifications.

Similarly, where the retrieved vehicle has a particular usage status (e.g., pre-owned), an alternative specification may be a different usage status (e.g., new). Requests for a pre-owned vehicle may therefore result in quotes for not only the pre-owned vehicles, but also new alternatives matching other features of the requested vehicle. The same logic may apply to determination of an alternative specification for any other feature or combination of features specifying make, model, year, trim, color, body style, vehicle segment, duty type, option, use level, inventory age, equipment level, etc.

In step 460, a set of search results is retrieved based on the alternative specification. Referring again to FIG. 5A, a search for a particular 2008 Chevrolet Impala LT may retrieve that vehicle. Alternatives may include a 2008 Chevrolet Impala LS (e.g., different trim), a 2009 Toyota Camry Hybrid sedan, and a 2009 Camry SE sedan ((e.g., different make/model, similar body style).

Additionally, FIG. 5B illustrates an exemplary screenshot of a compound price quote according to alternative embodiments of the invention. With respect to the heavy-duty 2008 Ford Expedition, the alternatives may include additional options within the same year, make, model and trim (e.g., "air suspension read—load leveling" and "rear seat entertainment DVD"). While it is possible for customer 110 to specify a desired product configuration, the product manufacturer (e.g., OEM) may not have built such a configuration. In such a case, an alternative/equivalent product may be selected. For example in the case of the 2008 Ford Expedition, the price quote request may have contained the desire for a heavy duty radiator which was not built for Expeditions within the customer 110's region. FIG. 5B illustrates the alternatives available which do not include the heavy duty radiator. The particular product configuration (or alternative/equivalent) can then be determined based on a preprogrammed selection algorithm. Preprogramming may be based on default configurations and/or customized by dealer 120, OEM , etc.

Figure 5C:
FIG. 5C illustrates an exemplary screenshot of a compound price quote according to another alternative embodiment.

FIG. 5C illustrates an exemplary screenshot of a compound price quote according to alternative embodiments of the invention. With respect to the 2009 Honda Civic, the price quote request may be for the LX 5-Speed Automatic 4dr Sedan and the alternatives are based on differing trims of the same Civic model (i.e., the LX-S and the EX) each of which have varying levels of equipment, ranging from a "conservatively equipped" unit to a "comfortably equipped unit" to a "generously equipped" unit.

In step 470 for some embodiments of the invention, representative vehicles are selected from the first set of search results based on the requested specification or the second set of search results based on the alternative specification. In some instances, the search incorporating the requested specification may retrieve too many vehicles to meet the target. As such, representative vehicles may need to be selected to comply with the target. For example, the search may need to be filtered to meet the target based on an alternative specification. The alternative specification may therefore supplement the requested specification in narrowing down the search results to meet the target. For example, a request for a "2010 Toyota Camry CE sedan" may result in 10 matches from a dealer who has defined a target to provide one vehicle each for a high price range, a middle price range, and a low price range. The ranges may be determined by taking the difference between the highest price (e.g., $40,000) and lowest price (e.g., $31,000) and dividing into thirds (e.g., $40,000-$31,000=$9000; $9000/ 3=$3000). The low range would be $31,000-$34,000; the middle range would be $34,000-$37,000; and the high range would be $37,000-$40,000. A dealer may specify any number of ranges as part of defining their respective targets for price quoting.

In this embodiment, the alternative specification may refer to a count of vehicle configurations (e.g., vehicles with the same features) identified for each price range. A vehicle having a configuration with the highest count within each price range (e.g., 2010 Toyota Camry CE sedans with leather seats, GPS, leather seats and GPS) would be selected for inclusion in the price quote. Where there are ties in number of configurations within each price range, additional factors may come into play. For example, depending on which range the vehicle configuration falls into, a vehicle with the cheapest, median, or priciest vehicle configuration may be selected. Another factor in the selection is whether the prices of the selected vehicle configuration represent enough of a range for comparison.

Once the vehicles have been selected, the method may return to step 440 for determination of whether the target has been met. If so, the method proceeds to step 480 for generation of each price quote for the selected vehicles.

In step 480, a compound price quote is generated for the vehicles retrieved in steps 430 and/or 460. The compound price quote includes a price quote for each of a plurality of vehicles, each calculated according to the particular pricing scheme of the dealer(s) 120. A pricing scheme is a set of one or more pricing rules for a particular vehicle configuration. The pricing rules specified by a particular dealer 120 may refer to absolute selling price, pricing relative to the product's manufacturer-suggested retail price (MSRP), or pricing relative to the dealer's invoice price. Dealer invoice pricing may be obtained from the dealership in absolute fashion or through a formulaic calculation. The dealer 120 may also specify different rules for different configurations. As such, multiple pricing schemes may be associated with a particular dealer 120. For each vehicle, a pricing scheme may be identified from possibly multiple pricing schemes by dealer 120 and determined as being relevant to the specified product and customer.

Further, customer incentive information may also be provided by manufacturer incentives 210F in database 210 and applied to generate the price quote. This information may include but is not limited to cash back rebates, special financing rates, or special lease rates. In some instances, special pricing rules may apply. For example, a dealer 120 may be having a sale during a particular weekend in which a friends-and-family discount is available. Such special pricing rules may also be taken into account in the generation of the price quote.

The identified pricing scheme is applied to determine a price quote for each vehicle. A response may be prepared including the multiple price quotes and sent to the requesting party, which may be a customer 110 or a dealer 120. In addition to the price quote, other information may be provided to assist the customer 110 in making a decision. For example, a detailed description of each vehicle (including various other specifications available) may be provided from vehicle information 210C stored in database 210.

Further, if the dealership wishes to indicate that the compound price quote has been sent on behalf of a particular individual (i.e., a sales representative), such information may also be sent along with the price quote. Such information, along with dealer-specific information (i.e., address, operating hours) may be provided by communication template 210G stored in database 210. The information for the vehicle price quote is incorporated into the template dynamically to produce the desired vehicle price quote communication. The compound price quote (and any accompanying information) may then be issued via e-mail, web, SMS, text, mobile communication and others known in the art. If the compound price quote is issued to a customer 110, a copy may also be provided to the identified dealer 120.

Figure 6:
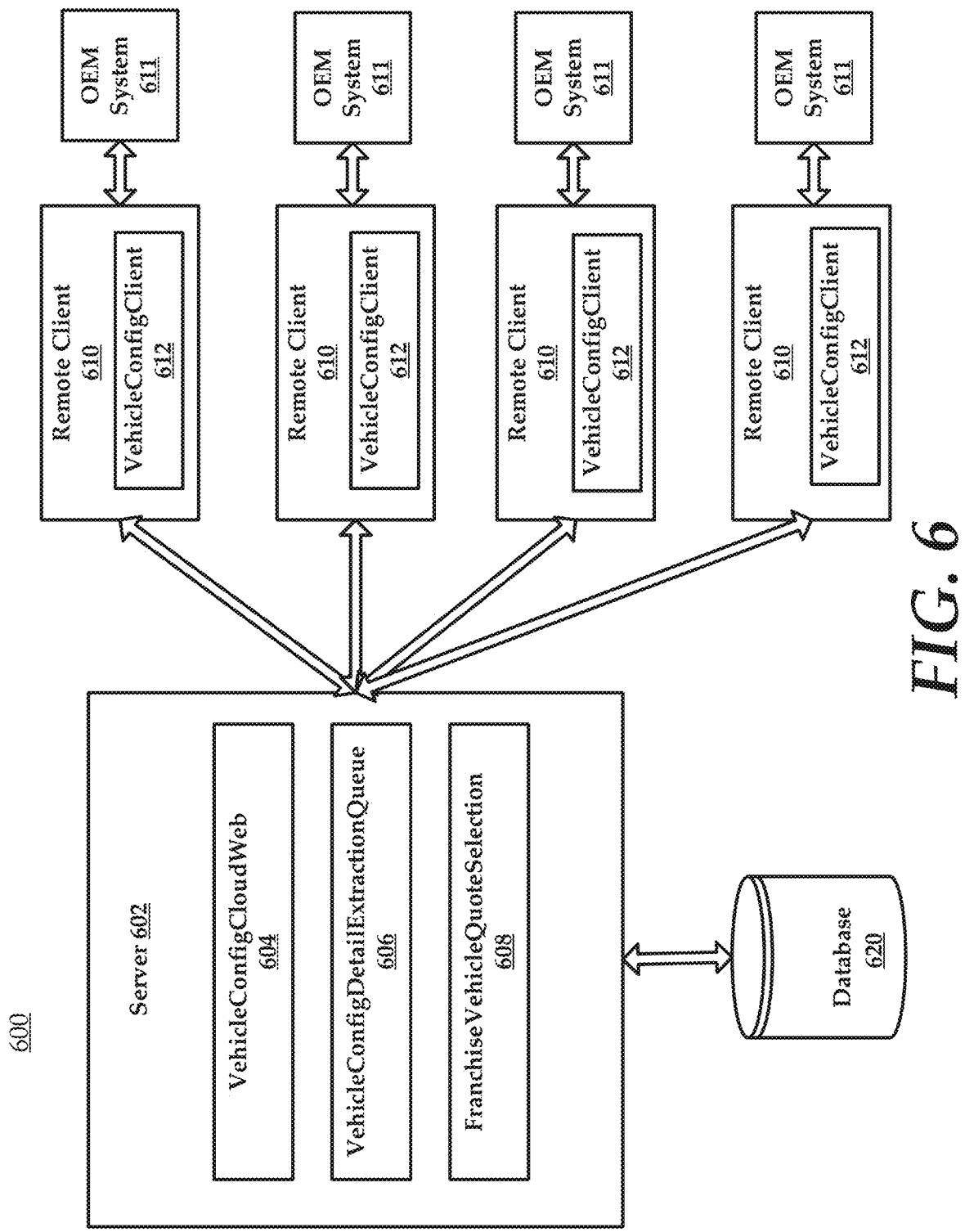
FIG. 6 is a schematic diagram of another example system of the present disclosure.
Figure 7:
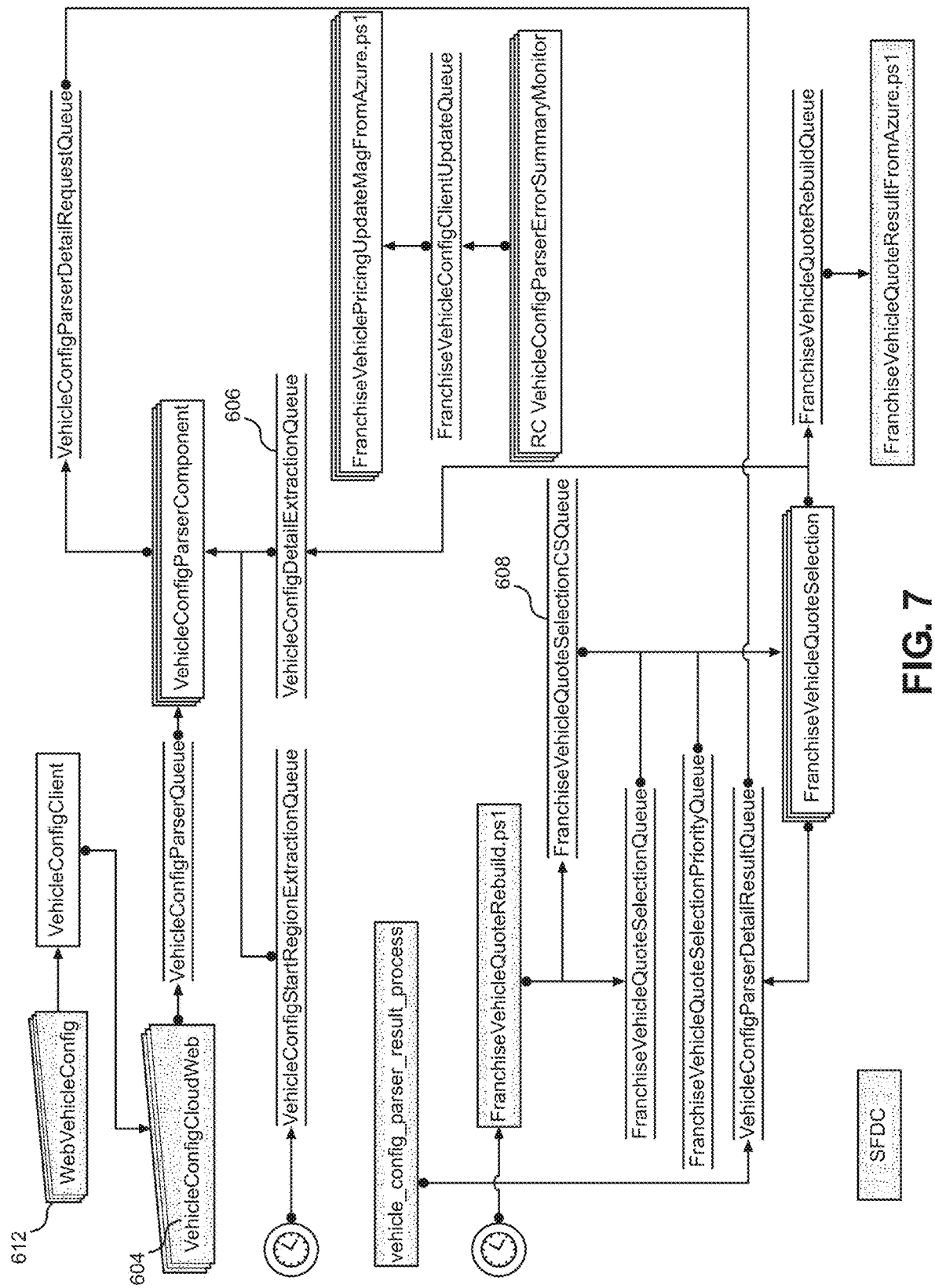
FIG. 7 is a flow diagram of an improved database management method through the system of FIG. 6.

FIGS. 6 and 7 collectively illustrate a flow diagram of an improved database management method through an example system 600 of the present disclosure, which leverages distributed computing agents. The system 600 is a component of a larger networked system illustrated in FIGS. 10A-G. The system 600 generally comprises a server 602 comprising a VehicleConfigCloudWeb 604, a VehicleConfigDetailExtractionQueue 606, and FranchiseVehicleQuoteSelection 608, and a database 620. The system 600 also comprises remote client 610 that each includes a VehicleConfigClient 612. In general, the system 600 can comprise additional or fewer components than those illustrated in FIG. 6.

As illustrated in FIG. 7, in some embodiments the system 600 provides distributed computing, and specifically querying of dealership inventory through distribution of the VehicleConfigClient 612 to each remote client 610 (see FIG. 6 for remote clients and system). The VehicleConfigClient 612 is installed on a remote client 610 such as an inventory computing system of a dealership. Various dealerships across a country or the world can interconnect with the server 602 through installation of the VehicleConfigClient 612.

In some embodiments, the remote client 610 can cooperate with OEM (original equipment manufacturer) systems 611.

The VehicleConfigCloudWeb 604 acts as a mediator or director for all remote inventory operations conducted by the VehicleConfigClient 612 installed remotely. In some embodiments, queries for specific inventory are distributed to one or more of the remote clients based on a query type. For example, if the query is for a specific manufacturer vehicle type, the query is tailored to the specific requirements or attributes used by the manufacturer to describe their vehicle models. Other non-manufacturer specific query limitations can also be included such as price, miles, and so forth. In some embodiments, these portions of the query that include non-manufacturer specific information can be used in an initial query executed by the remote client 610 that locates thin locator style records.

In general, when a remote client is operating on a large inventory the time required to execute a single query and obtain information may be too great. Query distribution helps remote clients obtain requested data in parallel without causing delays.

In some embodiments, remote clients 610 perform a full collection of all vehicle inventory entries visible to them. This may cause significant load on not only the remote clients and the OEM original equipment manufacturer system being targeted for collection, but also any local systems extracting and processing these vehicle inventory entries. Furthermore, this load may cause significant delays throughout the various stages of the process (see full flow in FIGS. 10A-G). Vehicle inventory may become "stale" (weeks or even months out of date), resulting in customer complaints due to processing delays in generating query responses.

It will be understood that at least a portion of the remote clients have overlapping vehicle inventory views. For example, several dealerships may sell vehicles that have similar attributes to one another. Significant computing resources may be expended on duplicated entries or inefficient scheduling.

In some embodiments, the VehicleConfigCloudWeb 604 and client side VehicleConfigClient 612 are enhanced to operate as an intelligent network of client nodes that are context aware. VehicleConfigClients are now directed to perform specific extraction operations relative to current vehicle inventory queries. These queries can cover attributes such as status, specific OEM, year, make, model, and trim—just to name a few. This information can be obtained, for example, from OEM or dealer inventory systems.

These coordinated, context-aware methods of inventory collection allows for significant enhancements to the processing and importing of incoming inventory data from remote clients 610. Vehicle inventory data can now be processed incrementally and differentially.

These process improvements, such as using distributed agents and thin locator style records, have allowed for maintaining an operating set of vehicle inventory records that are never more than 24 hours out of date. These improvements have also made VehicleConfigClient 612 less disruptive to remote client 610 and OEM systems and networks.

Historically, vehicle inventory data is imported into and consumed from a RDBMS (relational database management system) in a standard "thick" relational data model. Performance and scalability issues became significant obstacles when attempting to leverage vehicle inventory data. The VehicleConfigDetailExtractionQueue 606 can become backlogged resulting in delays in processing incoming inventory updates of days or more.

The present disclosure provides an improved method that leverages a NoSQL data-tier of semi-structured data that represents an entire vehicle inventory record with all associated metadata. This embodiment provides efficiencies as placing the database into a NoSQL data-tier increase data availability. The VehicleConfigDetailExtractionQueue 606 executes an improved RDBMS schema to provide thin locator style records that remain resident in memory, such as a cache memory 622 of the system 600. Consumers of this data can now quickly locate vehicle inventory by using key identifiers (VIN, year, make, model, MSRP, region, and so on) and access the full vehicle inventory record with a subsequent call to a distributed NoSQL system.

As mentioned above, remote agents are located in specific geographical locations associated with dealerships that comprise inventory. If a prior query for a vehicle in a geographical location has been resolved by one or more remote agents the server will use a solution generated by the one or more remote agents rather than refreshing a response to the query.

Thus, the VehicleConfigDetailExtractionQueue 606 is configured to perform a preliminary query for high level database field information (e.g., data included in thin locator style records), which is followed by a subsequent call for full records when one or more responses from the initial query are selected for further review. In some embodiments, an endpoint of the distributed inventory system is a quoting engine, represented by FranchiseVehicleQuoteSelection 608.

These enhancements allow the system 600 to deliver much more granular inventory selections to customers in a significantly reduced time. The system 600 is not bound to specific algorithms such as median MSRP when selecting alternatives and can now make intelligent selections based on contextual elements present in a lead such as vehicle year, make, model, and body style—just to name a few.

Also, as mentioned above, the remote agents are distributed and reside in various specific geographical locations. If a query has been recently resolved in the same local geographical area by remote agents, the server may not attempt to refresh that query, but will use the prior results.

Peak quote generation times using the system 600 have been reduced by an order of magnitude, from sometimes exceeding an hour to often processed and generated in less than three minutes.

Advantageously, the system 600 provides improvements in specific metrics. For example, mean vehicle inventory freshness metric has been improved from one to seven days to less than 24 hours. Peak mean quite delay metric would improve from 60 minutes to approximately three minutes. System vehicle inventory capacity improves from 100,000 entries to an infinite number of horizontal entries. Available alternative selection parameters have been expanded from the system 600 only using manufacturer suggested retail price to using any permutation of any number of parameters. In some embodiments, a vehicle blob comprises data (e.g., attributes) of a single vehicle whereas a franchise blob can include a franchise inventory list of vehicles and their attributes.

Figure 8:
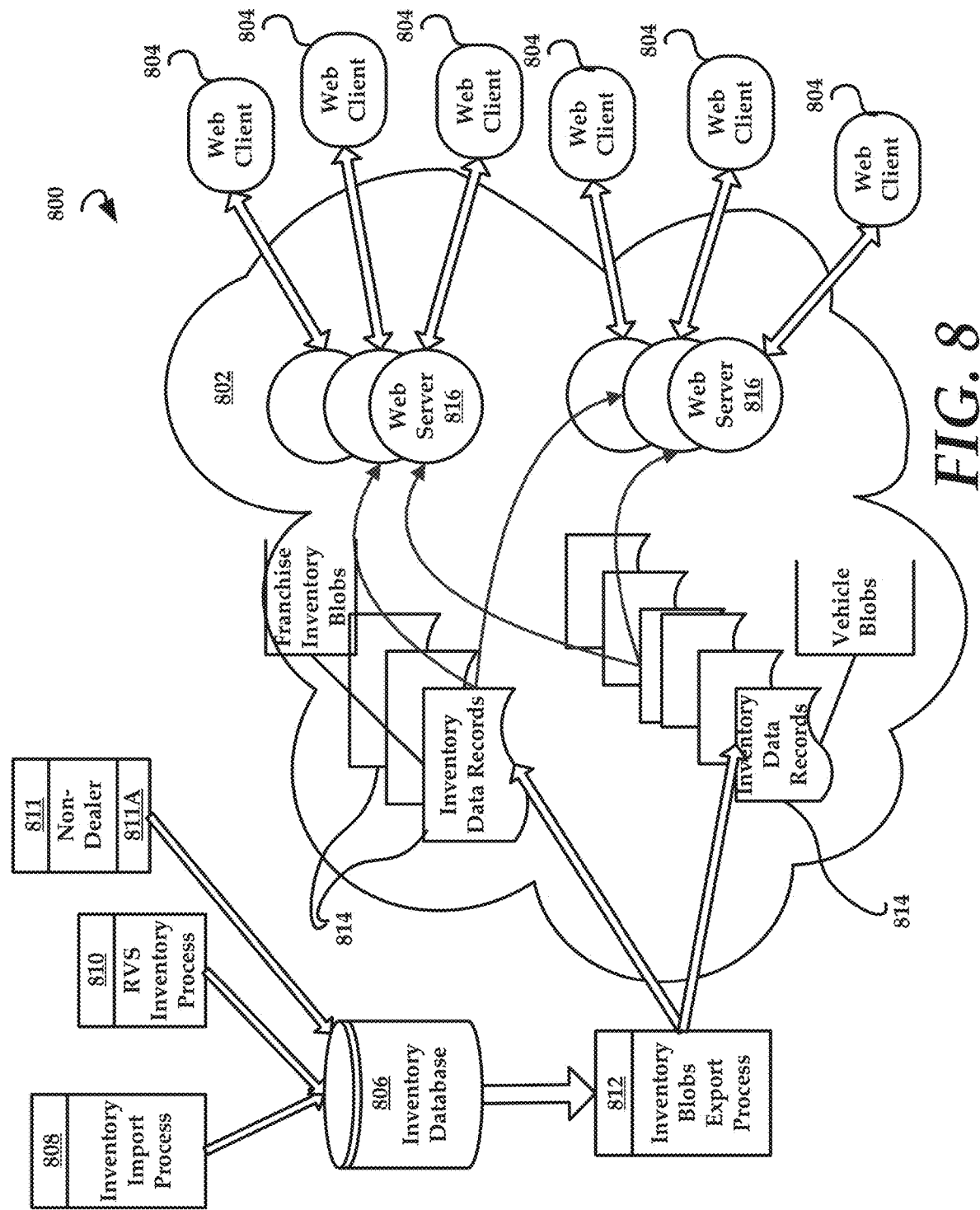
FIG. 8 is a schematic diagram of another example system of the present disclosure that provides improved database management.

FIG. 8 is a schematic diagram of another example cloud-based implementation of the distributed computing systems of the present disclosure. The system 800 of FIG. 8 comprises a specific cloud-based embodiment of the system disclosed above with respect to FIGS. 6 and 7. In one embodiment, the system 800 comprises a cloud computing environment 802, a plurality of web clients (e.g., end users) 804, and an inventory database 806.

In some embodiments, an inventory import process 808 provides near-real time inventory information from remote agents associated with the remote clients that install the remote agents (see FIGS. 6 and 7 as an example). The inventory information can comprise any of thin records and/or complete or full records. Inventory can also be received from a RVS inventory process 810 (e.g., remote client 610 and VehicleConfigClient 612). Additionally, the inventory information can originate from a non-dealership source 811. The non-dealership source can include but is not limited to salvage companies, leasing companies, and auto rental agencies or any other company that sells vehicles. The non-dealership source can be configured with a remote agent and can include an interface 811a to support communications between the non-dealership companies 811 and the inventory database 806.

The inventory database 806 provides inventory blobs (comprises vehicle information in some embodiments) in an export process 812 to the cloud computing environment 802. These blobs are imported into the cloud computing environment 802 as records, such as inventory data records 814.

In some embodiments, the cloud computing environment 802 comprises web servers such as web server 816 that processes queries received from the plurality of web clients 804 and returns results to the plurality of web clients 804.

Figure 9:
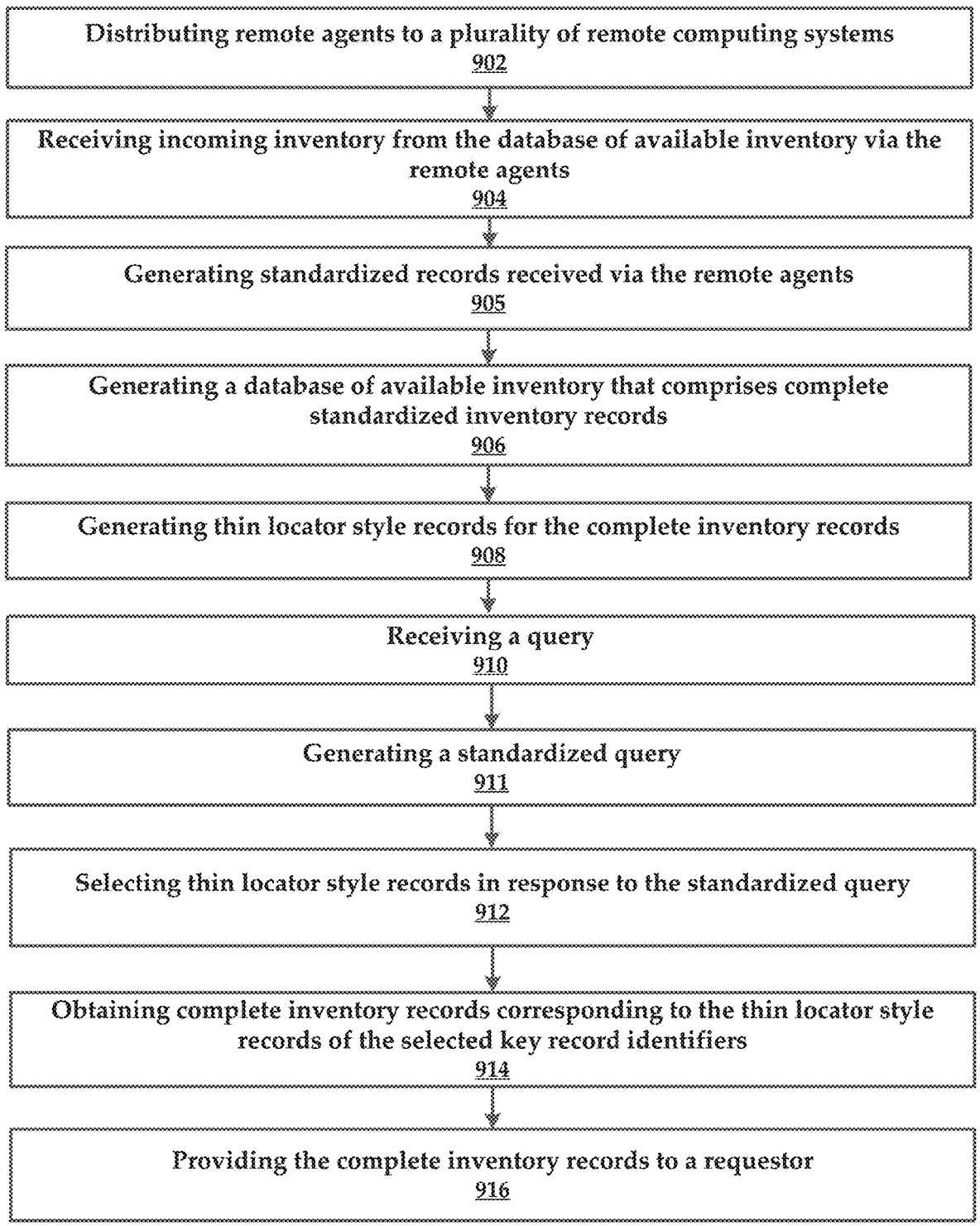
FIG. 9 is a flowchart of an example method of the present disclosure that illustrates distributed agent computing and database query optimization.
Figure 10A:
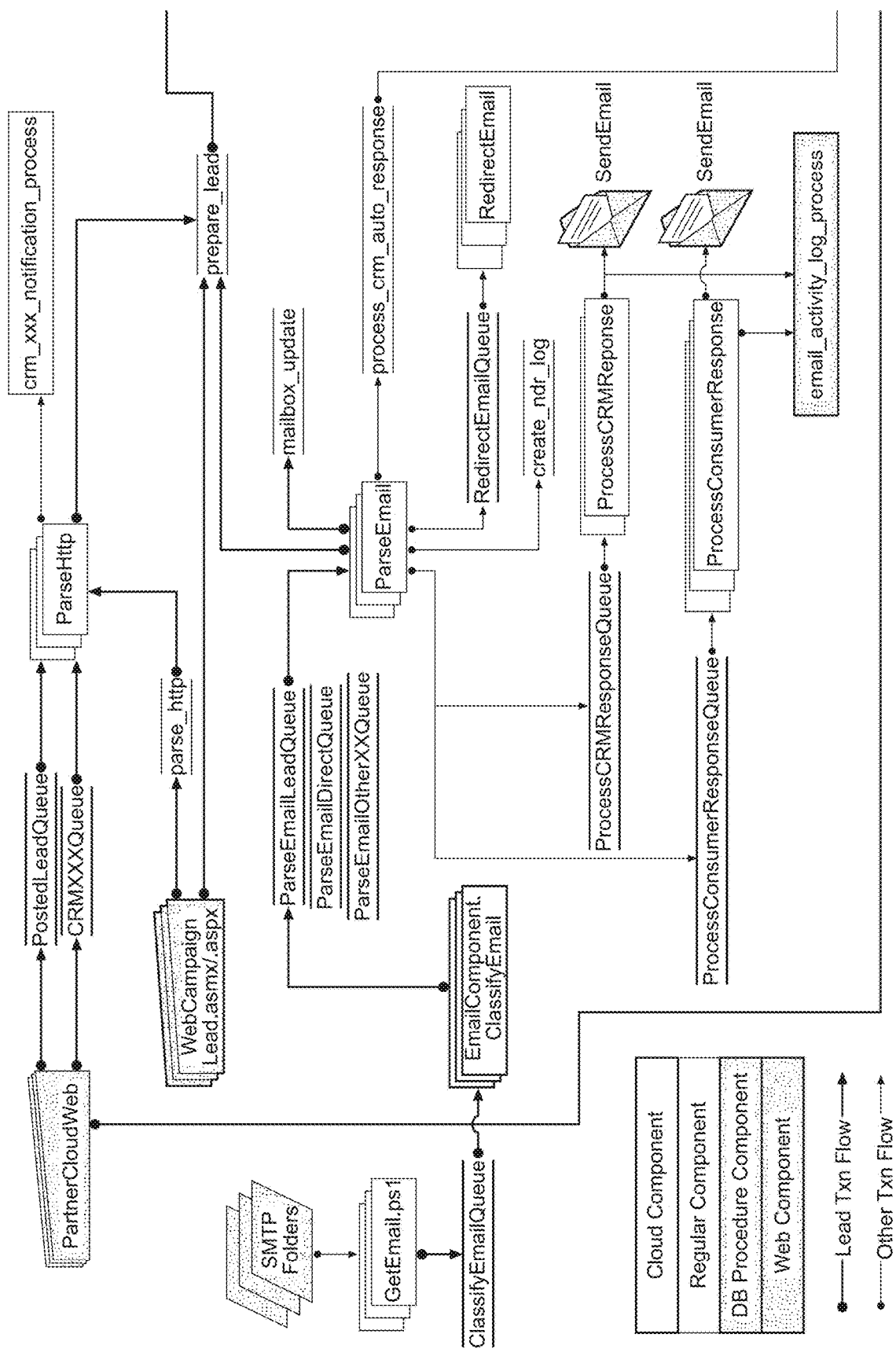
FIGS. 10A-G collectively illustrate a flow process of inventory management that includes the flow diagram of FIGS. 7.
Figure 10B:
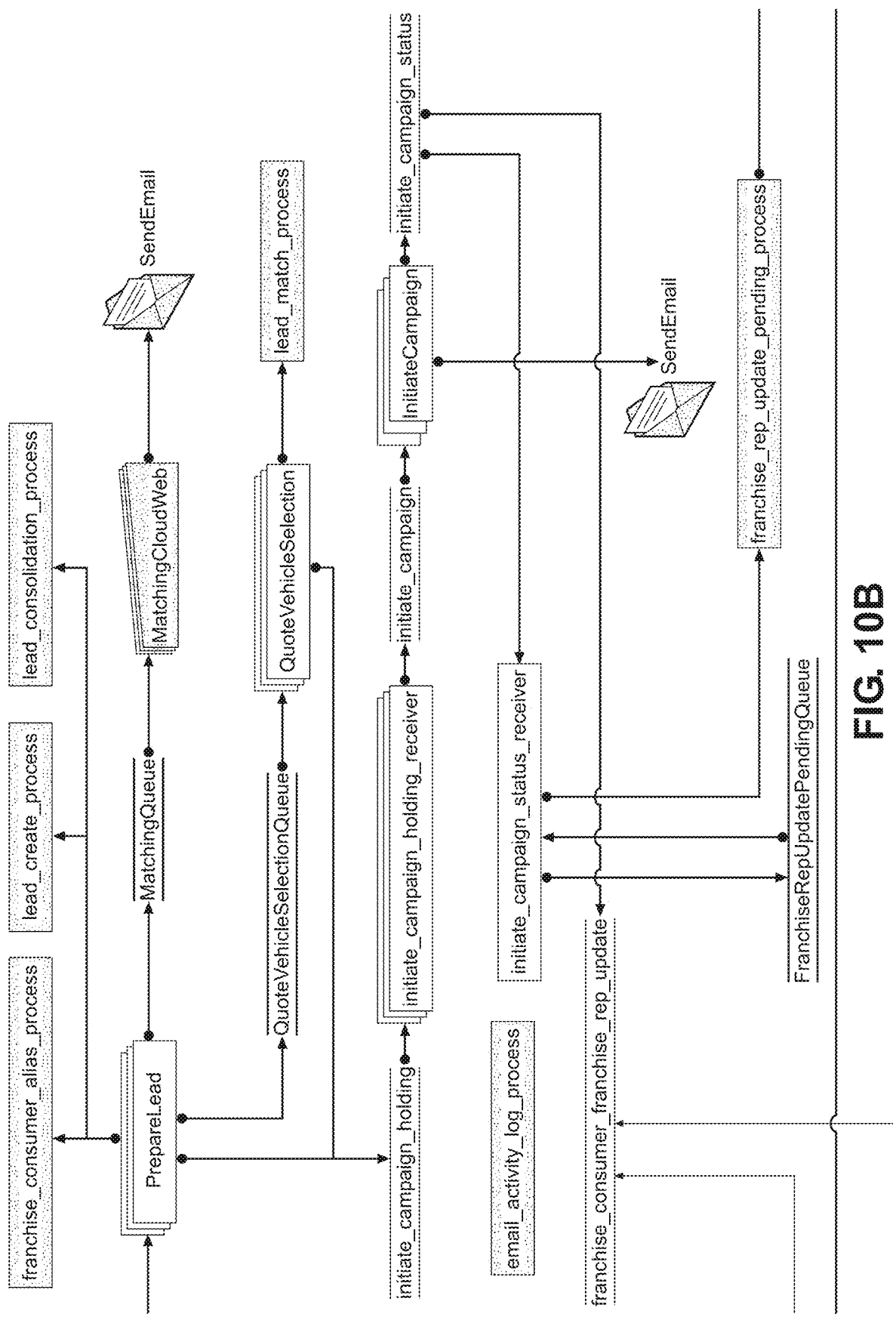
Figure 10C:
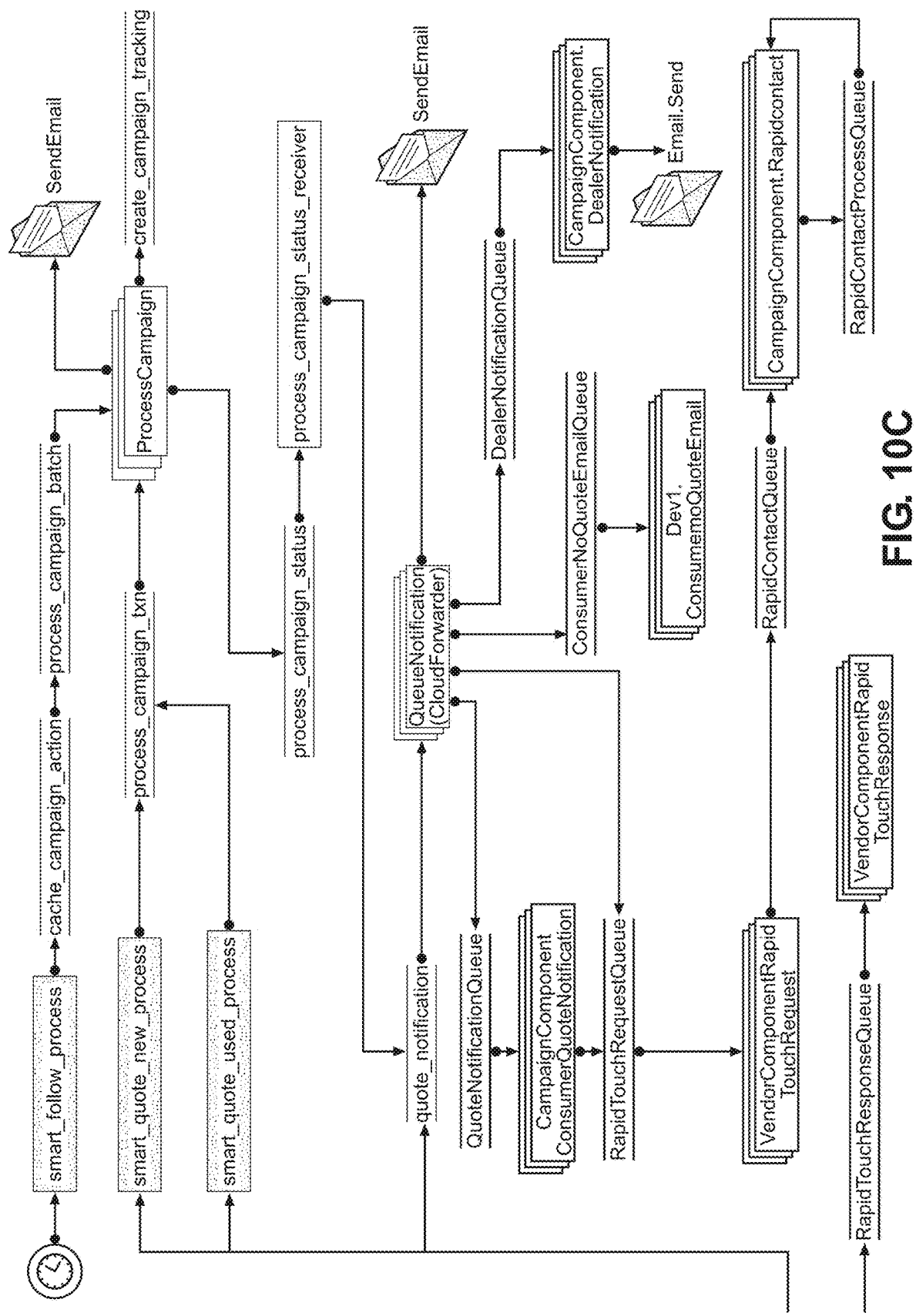
Figure 10D:
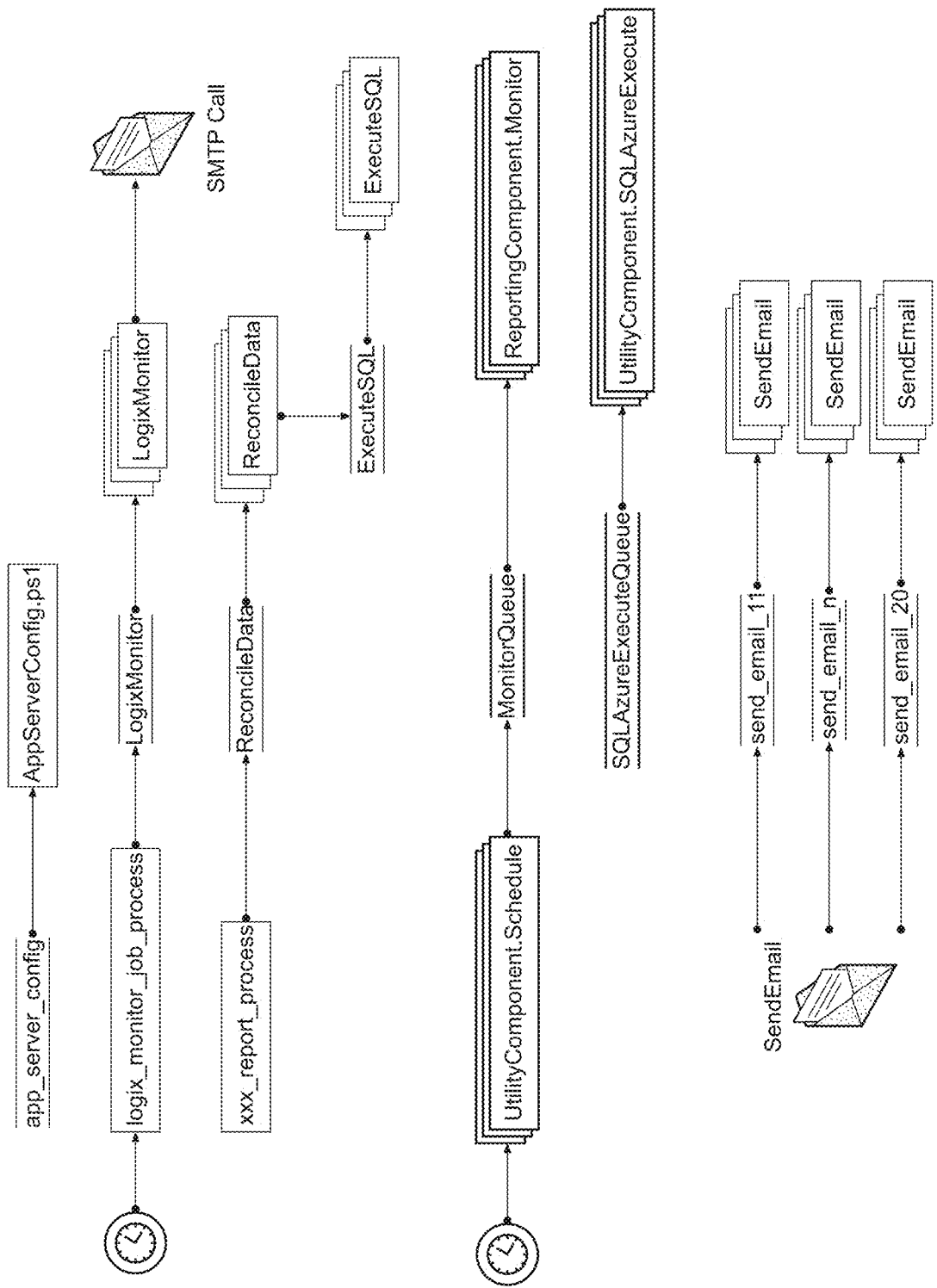
Figure 10E:
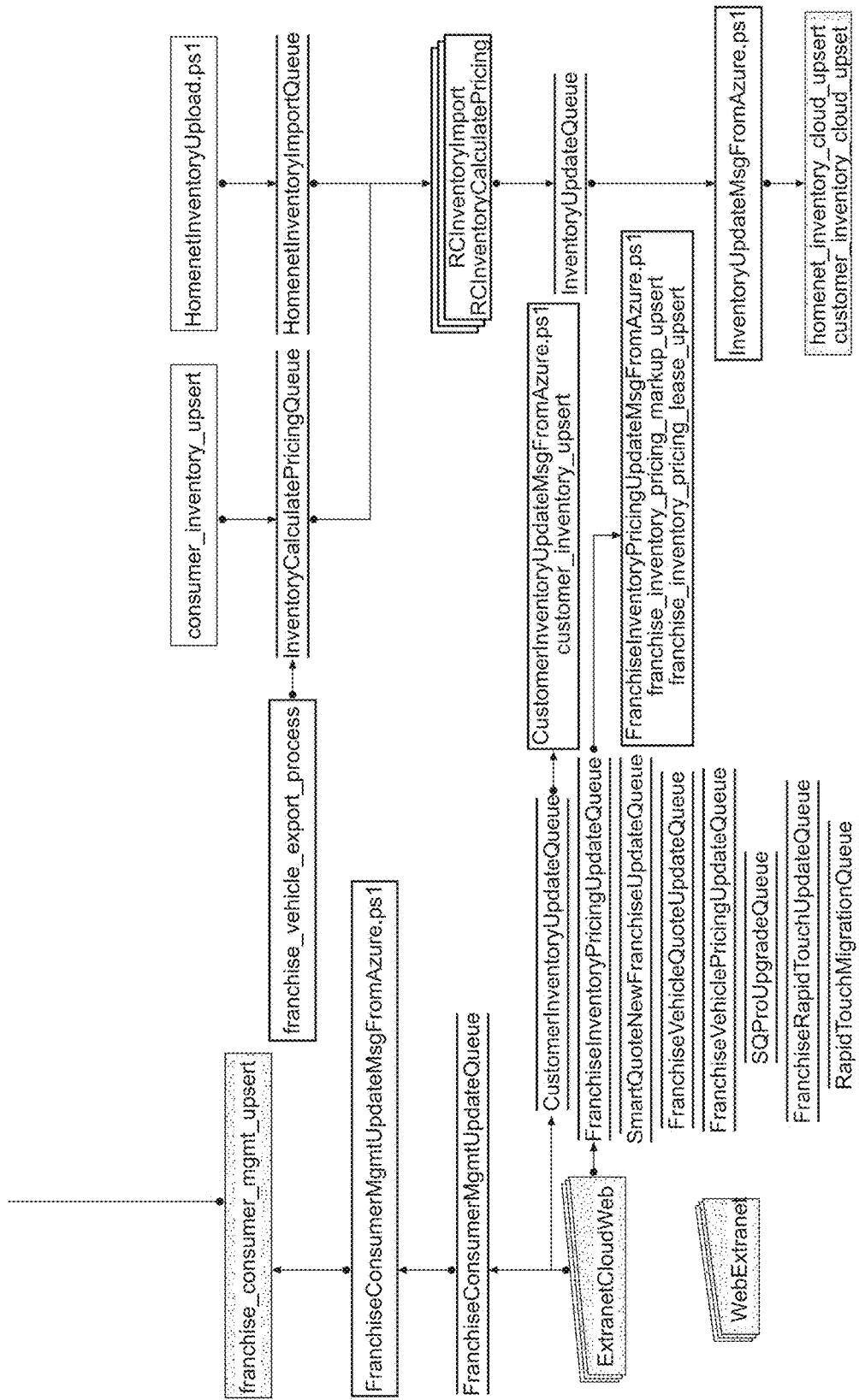
Figure 10F:
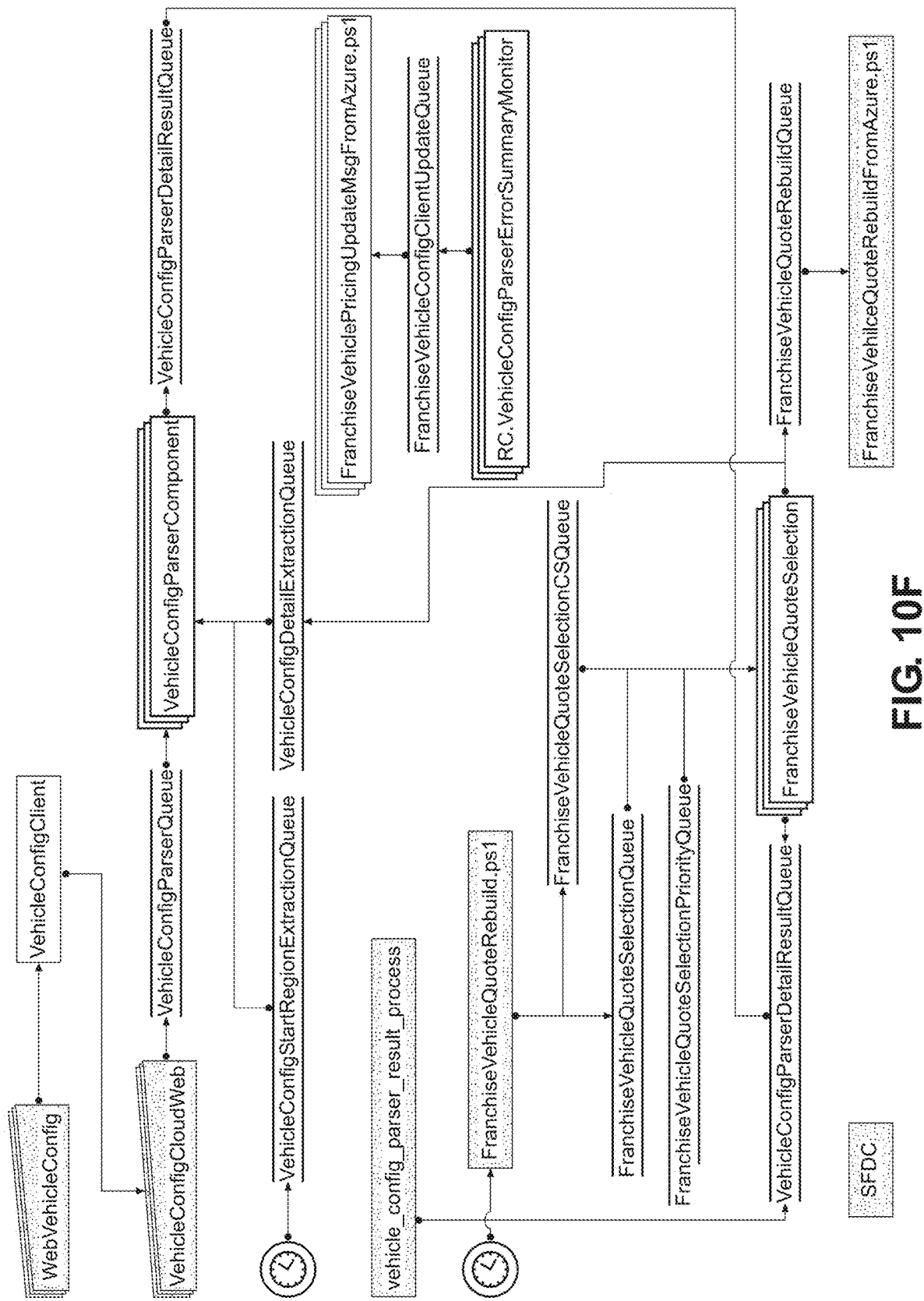
Figure 10G:
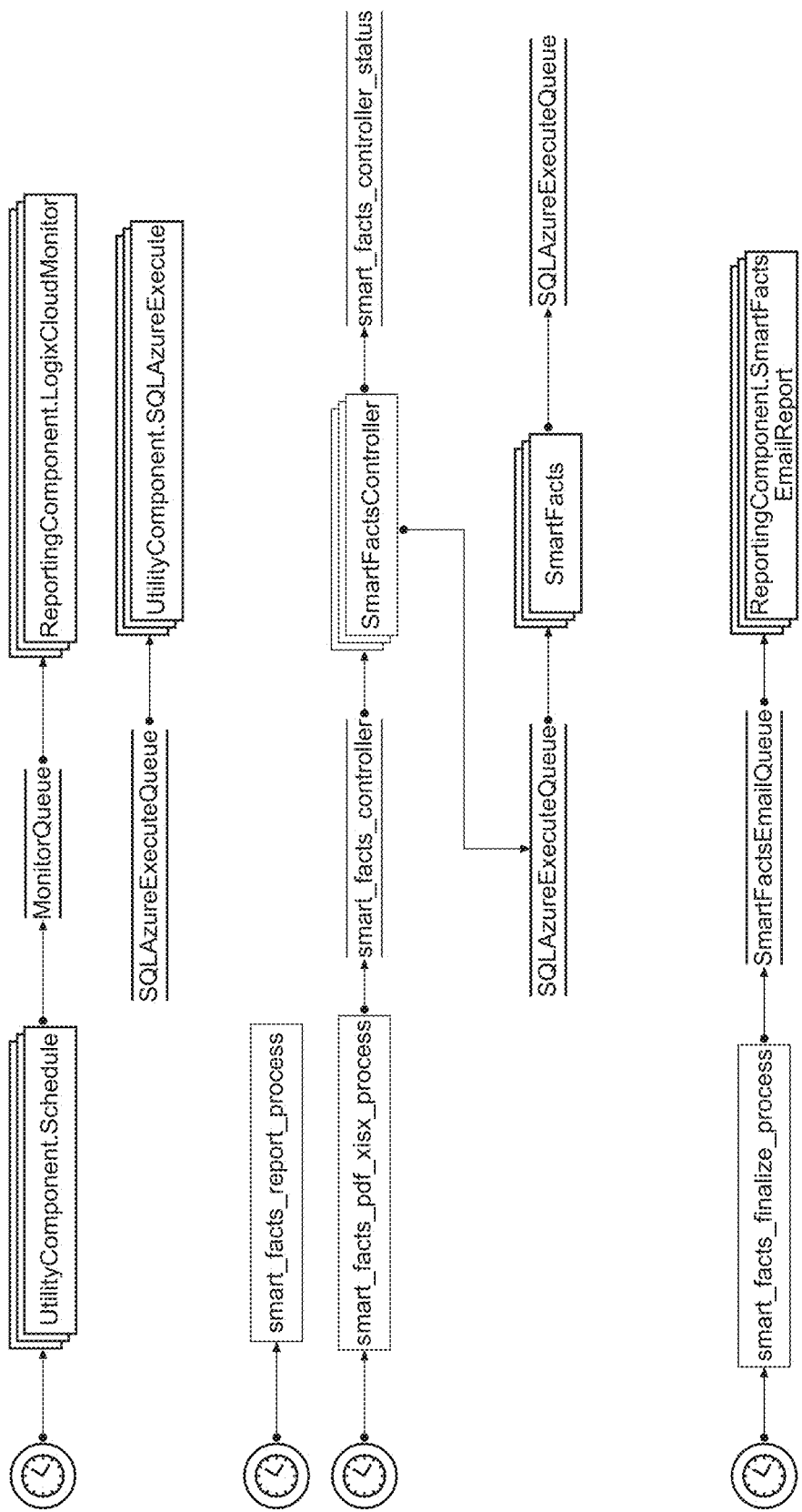

FIG. 9 is a flow diagram of an example method 900 of the present disclosure. The method includes a step 902 of distributing remote agents to a plurality of remote computing systems. Again, the remote agents can be installed on the computing systems of dealerships in varied geographical locations. In some embodiments, the method includes a step 904 of receiving incoming inventory from the database of available inventory via the remote agents. In some embodiments, the remote agents can schedule transmissions of inventory records to a cloud service such that the cloud service has a continually updated inventory database available for querying against. Additionally, the method can include a step 905 of generating standardized inventory records received via the remote agents. The generating standardized inventory records step 905 can include tokenizing each field of the received record associated with the database and converting all or some of the fields into a standardized record format. This step 905 operates as described above where a fields such as the vehicle make, "CHEVY", is converted to the standard record format "CHEVROLET." This standardization conversion can occur for some or all of the fields in the inventory record. These fields can include but are not limited to vehicle year, make, model, and body style. A person skilled in the art of database programming would be able to tokenize an inventory string, convert the fields into a standard form before loading the standardized inventory record into the database.

According to some embodiments, the method comprises a step 906 of generating a database of available inventory that comprises complete inventory records. Again, this can include thin or full inventory records as described above.

The method also comprises a step 908 of generating thin locator style records for the complete inventory records. The thin locator style records comprise key record identifiers that are indicative of the content included in the complete record. For example, key record identifiers could include VIN, year, make, model, MSRP, region, and so on. When a query is executed it can include a permutation of these key record identifiers, which allows the cloud service to pare results from the full inventory.

Next, the method includes a step 910 a query is received. In a step 911, the query is converted to a standardized query. The fields in the query are converted to a form that match the fields in the database and thereby enabling a database search based on standard terms. In other embodiments, the query can be executed against an inventory database available to the cloud service. According to some embodiments the query can comprise a price matching quote as described in greater detail with respect to the embodiments of FIGS. 1A-5C.

In some embodiments, the method comprises a step 912 of selecting thin locator style records in response to the query. Again, this step can comprises using key record identifiers included in a price matching quote to cull or select from the thin locator style records that correspond to the key record identifiers. In some embodiments, the cloud services allows for exact or fuzzy matching where records that include some but not all of the key record identifiers in the price matching quote are selected.

According to some embodiments, the method comprises a step 914 of obtaining complete inventory records corresponding to the thin locator style records of the selected key record identifiers. For example, a user can select one or more of the inventory records based on the retrieval of thin locator style records. The cloud service can then obtain the full inventory records based on the selection(s).

In some embodiments, the method comprises a step 916 of providing the complete inventory records to a requestor. For example, this could include displaying the records on a display device, emailing the records, or other similar methods of delivery of a database record.

Collectively, FIGS. 10A-G illustrate a price quote matching methodology that integrates the distributed computing and database improvements described above. To be sure, FIG. 10F corresponds to FIG. 7 which was described in greater detail supra.

Some of the above-described functions can be composed of instructions that are stored on storage media (e.g., computer-readable medium). The instructions may be retrieved and executed by the processor. Some examples of storage media are memory devices, tapes, disks, integrated circuits, and servers. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable medium" and "computer-readable media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A computer-implemented method by a server, comprising:
    distributing remote agents to a plurality of remote computing systems;
    receiving incoming inventory from a database of available inventory via the remote agents;
    generating standardized inventory records received via the remote agents;
    generating the database of available inventory that comprises complete standardized inventory records;
    generating thin locator style records for the complete standardized inventory records, wherein the thin locator style records comprise key record identifiers, wherein the thin locator style records are maintained in a cache memory such that the thin locator style records are configured to be used for periodic updates to the database and execution of one or more standardized queries for the complete standardized inventory records;
    receiving a query from a web client;
    generating a standardized query;
    selecting the thin locator style records in response to the standardized query;
    obtaining the complete standardized inventory records corresponding to the thin locator style records of the selected key record identifiers; and
    providing the complete standardized inventory records to the web client.

2. The method according to claim 1, wherein each of the plurality of remote computing systems is coupled with an original equipment manufacturer system and at least a portion of the complete standardized inventory records are obtained from the original equipment manufacturer system.

3. The method according to claim 1, wherein each of the plurality of remote computing systems is coupled with a non-dealership system and at least a portion of the complete standardized inventory records are obtained from the non-dealership system.

4. The method according to claim 1, wherein the incoming inventory is received periodically from the remote agents.

5. The method according to claim 1, wherein the database stores information concerning a plurality of vehicles available for sale, the stored information including a plurality of features for each vehicle.

6. The method according to claim 5, wherein the standardized query comprises a price quote request, the price quote request specifying a make and model for a requested vehicle.

7. The method according to claim 6, wherein the complete standardized inventory records comprise a first set of vehicles from the plurality of vehicles which match the make and model of the requested vehicle.

8. The method according to claim 7, further comprising
determining that a first set of complete standardized inventory records does not meet a predefined target, the predefined target including a minimum number of vehicles for inclusion in a price quote response;
identifying a body style of the requested vehicle; and
retrieving a second set of complete standardized inventory records from the database, the second set of complete standardized inventory records including a second set of vehicles from the plurality of vehicles which match at least the body style of the requested vehicle.

9. The method according to claim 8, further comprising:
selecting a third set of vehicles from the first and second sets of complete inventory records for the price quote response in accordance with the predefined target; and
generating the price quote response.

10. The method of claim 1, wherein a minimum number of vehicles is defined prior to receiving a price quote request.

11. The method of claim 1, wherein the incoming inventory is received and the thin locator style records are generated such that the database of available inventory is never more than 24 hours old.

12. A system, the system comprising:
remote agents distributed by a server to a plurality of remote computing systems; and
the server in communication with the remote agents that:
receives incoming inventory from a database of available inventory from the remote agents;
generates a standardized inventory record;
generates the database of available inventory that comprises complete standardized inventory records;
generates thin locator style records for the complete standardized inventory records, wherein the thin locator style records comprise key record identifiers, wherein the thin locator style records are maintained in a cache memory such that the thin locator style records are configured to be used for periodic updates to the database and execution of one or more standardized queries for the complete standardized inventory records;
receives a query from a web client;
generates a standardized query;
selects the thin locator style records in response to the standardized query;
obtains the complete standardized inventory records corresponding to the selected thin locator style records comprising selected key record identifiers; and
provides the complete standardized inventory records to the web client.

13. The system according to claim 12, wherein each of the plurality of remote computing systems is coupled with an original equipment manufacturer system and at least a portion of the complete standardized inventory records are obtained from the original equipment manufacturer system.

14. The system according to claim 12, wherein each of the plurality of remote computing systems is coupled with a non-dealership system and at least a portion of the complete standardized inventory records are obtained from the non-dealership system.

15. The system according to claim 12, wherein the incoming inventory is received periodically from the remote agents in an incremental manner.

16. The system according to claim 12, wherein the database stores information concerning a plurality of vehicles available for sale, the stored information including a plurality of features for each vehicle.

17. The system according to claim 16, further comprising:
determining that a first set of complete standardized inventory records does not meet a predefined target, the predefined target including a minimum number of vehicles for inclusion in a price quote response;
identifying a body style of a requested vehicle;
retrieving a second set of complete standardized inventory records from the database, the second set of complete standardized inventory records including a second set of vehicles from the plurality of vehicles which match at least the body style of the requested vehicle;
selecting a third set of vehicles from the first and second sets of complete standardized inventory records for the price quote response in accordance with the predefined target; and
generating the price quote response.

18. The system according to claim 17, wherein the query comprises a price quote request, the price quote request specifying a make and model for the requested vehicle, and further wherein the complete standardized inventory records comprise a first set of vehicles from the plurality of vehicles which match the make and model of the requested vehicle.

19. The system according to claim 18, wherein the remote agents are located in specific geographical locations, further wherein if a prior query for another vehicle in a geographical location has been resolved by one or more remote agents, the server will use a solution generated by the one or more remote agents rather than refreshing a response to the query.

* * * * *